United States Patent
Liu et al.

(10) Patent No.: US 12,316,557 B2
(45) Date of Patent: May 27, 2025

(54) INFORMATION TRANSMISSION METHOD AND APPARATUS

(71) Applicant: Huawei Technologies Co., Ltd., Shenzhen (CN)

(72) Inventors: Chenchen Liu, Shenzhen (CN); Bo Gong, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/340,567

(22) Filed: Jun. 23, 2023

(65) Prior Publication Data

US 2023/0344574 A1    Oct. 26, 2023

Related U.S. Application Data

(63) Continuation of application No. PCT/CN2021/135140, filed on Dec. 2, 2021.

(30) Foreign Application Priority Data

Dec. 26, 2020    (CN) .......................... 202011569822.3

(51) Int. Cl.
    *H04W 4/00*    (2018.01)
    *H04L 5/00*    (2006.01)

(52) U.S. Cl.
    CPC .......... *H04L 5/0044* (2013.01); *H04L 5/0094* (2013.01)

(58) Field of Classification Search
    CPC . H04L 5/0044; H04L 5/0094; H04L 27/2621; H04L 5/001; H04L 27/2614; H04L 5/0007; H04L 27/2603; H04L 5/0048; H04L 5/0053
    See application file for complete search history.

(56) References Cited

U.S. PATENT DOCUMENTS 9,832,058 B2    11/2017   Lee et al.
9,907,066 B2 *   2/2018   Park ...................... H04L 5/0048
11,528,174 B2 * 12/2022   Gan .................... H04L 27/2613
(Continued)

FOREIGN PATENT DOCUMENTS

CN    101374125 A    2/2009
CN    104247316 A   12/2014
(Continued)

OTHER PUBLICATIONS

Park, E. et al., "Phase Rotation Proposal", IEEE 802.11-20/0406r0, Mar. 16, 2020, 11 pages.
(Continued)

*Primary Examiner* — Thai Dinh Hoang
(74) *Attorney, Agent, or Firm* — Slater Matsil, LLP

(57) ABSTRACT

This application relates to the field of communication technologies, and provides an information transmission method and an apparatus. The information transmission method includes: A transmit device generates a PPDU of a 320 MHz bandwidth, where some or all fields of the PPDU are rotated in the 320 MHz bandwidth based on a rotation factor sequence, the 320 MHz bandwidth includes sixteen 20 MHz sub-channels, the rotation factor sequence includes 16 rotation factors, and each 20 MHz sub-channel corresponds to one rotation factor. The transmit device sends the PPDU.

16 Claims, 11 Drawing Sheets

(56) References Cited

U.S. PATENT DOCUMENTS

| | | | |
|---|---|---|---|
| 2013/0315169 A1* | 11/2013 | Porat | H04B 7/0413 370/329 |
| 2013/0322563 A1* | 12/2013 | Van Zelst | H04L 27/2621 375/295 |
| 2014/0153507 A1* | 6/2014 | Yang | H04L 27/2602 370/329 |
| 2016/0050672 A1* | 2/2016 | Chen | H04L 1/0071 370/329 |
| 2016/0165589 A1 | 6/2016 | Chu et al. | |
| 2016/0241369 A1* | 8/2016 | Yang | H04L 1/0071 |
| 2016/0242177 A1* | 8/2016 | Seok | H04L 69/322 |
| 2016/0286551 A1* | 9/2016 | Lee | H04L 25/0226 |
| 2017/0041825 A1* | 2/2017 | Yang | H04W 28/065 |
| 2017/0070312 A1* | 3/2017 | Yi | H04W 72/541 |
| 2017/0105143 A1* | 4/2017 | Seok | H04L 27/2602 |
| 2017/0118665 A1* | 4/2017 | Park | H04W 24/08 |
| 2017/0126456 A1* | 5/2017 | Lee | H04W 84/12 |
| 2017/0155486 A1* | 6/2017 | Park | H04L 5/005 |
| 2018/0205587 A1* | 7/2018 | Xiang | H04L 27/2603 |
| 2019/0289612 A1* | 9/2019 | Chen | H04L 27/2613 |
| 2020/0228380 A1* | 7/2020 | Yang | H04L 27/2621 |
| 2021/0204299 A1* | 7/2021 | Yun | H04W 72/542 |
| 2021/0320830 A1 | 10/2021 | Park et al. | |
| 2021/0336827 A1* | 10/2021 | Park | H04L 1/0069 |
| 2021/0344540 A1* | 11/2021 | Park | H04L 27/261 |
| 2021/0391961 A1* | 12/2021 | Cao | H04L 1/08 |
| 2021/0392661 A1* | 12/2021 | Cao | H04L 5/0048 |
| 2022/0029772 A1* | 1/2022 | Wu | H04L 5/0044 |
| 2022/0078884 A1* | 3/2022 | Liang | H04L 27/2603 |
| 2022/0140962 A1* | 5/2022 | Park | H04L 27/262 370/330 |
| 2022/0278877 A1* | 9/2022 | Park | H04L 27/2613 |
| 2022/0278883 A1* | 9/2022 | Park | H04W 28/20 |
| 2022/0311566 A1* | 9/2022 | Liang | H04L 27/262 |
| 2022/0361170 A1* | 11/2022 | Park | H04L 27/262 |
| 2022/0416988 A1* | 12/2022 | Cao | H04L 5/0044 |
| 2023/0014333 A1* | 1/2023 | Park | H04L 5/0044 |
| 2023/0113253 A1* | 4/2023 | Park | H04L 5/0044 370/329 |
| 2023/0300015 A1* | 9/2023 | Park | H04L 27/2603 370/329 |

FOREIGN PATENT DOCUMENTS

| | | |
|---|---|---|
| CN | 105052102 A | 11/2015 |
| CN | 107040487 A | 8/2017 |
| CN | 110324268 A | 10/2019 |
| CN | 113691478 A | 11/2021 |
| JP | 2015518322 A | 6/2015 |
| JP | 2016504839 A | 2/2016 |
| JP | 2016536910 A | 11/2016 |
| JP | 2018532335 A | 11/2018 |
| WO | 2010006012 A1 | 1/2010 |
| WO | WO-2012062123 A1 * | 5/2012 ......... H04L 5/0048 |
| WO | 2013152111 A1 | 10/2013 |
| WO | WO-2017118420 A1 * | 7/2017 ......... H04L 25/0202 |
| WO | WO-2019184626 A1 * | 10/2019 ......... B30B 15/0035 |
| WO | WO-2020040622 A1 * | 2/2020 ......... H04L 1/0061 |
| WO | 2020045910 A1 | 3/2020 |
| WO | 2020050528 A1 | 3/2020 |
| WO | WO-2020111638 A1 * | 6/2020 ......... H04B 7/0413 |
| WO | WO-2020122530 A1 * | 6/2020 ......... H04L 27/261 |
| WO | WO-2021029552 A1 * | 2/2021 ......... H04L 27/2603 |
| WO | WO-2021045421 A1 * | 3/2021 ......... H04L 27/2602 |
| WO | WO-2021071132 A1 * | 4/2021 |

OTHER PUBLICATIONS

Park, E. et al., Phase Rotation Proposal Follow-Up, IEEE 802.11-20/0699r0, May 6, 2020, 35 pages.

IEEE Std 802.11™—2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, 3534 pages.

IEEE Std 802.11ac™—2013, IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHZ, Approved Dec. 11, 2013, 425 pages.

IEEE P802.11ax™M/D8.0, Oct. 2020, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, 820 pages.

IEEE P802.11be ™/D0.1, Sep. 2020, Draft Standard for Information Technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT), 299 pages.

IEEE Standards Association, "IEEE Standard for Information Technology—Telecommunications and information exchange between systems Local and metropolitan area networks—Specific requirements: Part 11: Wireless LAN Medium Access Control (MAC) and Physical Layer (PHY) Specifications: Amendment 4: Enhancements for Very High Throughput for Operation in Bands below 6 GHZ," Dec. 11, 2013, 425 pages, IEEE Computer Society.

IEEE Standards Association, "IEEE Standard for Information Technology—Telecommunications and information exchange between systems Local and metropolitan area networks—Specific requirements: Part 11: Wireless LAN Medium Access Control (MAC) and Physical Layer (PHY) Specifications," Dec. 7, 2016, 3534 pages, IEEE Computer Society.

Cheong, Minho et al., "Proposed Text for Gamma Phase Rotation for HE PPDU", IEEE P802.11 Wireless LANs, Jul. 25, 2016, 8 pages.

IEEE P802.11AX/D1.3, "Draft Standard for Information technology—Telecommunications and information exchange between systems Local and metropolitan area networks—Specific requirements: Part 11: Wireless LAN Medium Access Control (MAC) and Physical Layer (PHY) Specifications: Amendment 6: Enhancements for High Efficiency WLAN," Jun. 2017, 522 pages, IEEE.

Stephen McCann, "Minutes of the IEEE P802.11 Full Working Group", IEEE P802.11 Wireless LANs, Jul. 25, 2016, 35 pages.

Dandan Liang et al: "Phase Rotations Design for EHT", doc.: IEEE 802.11-19/1981r1, Jan. 12, 2020, total 10 pages.

Chenchen Liu et al.: "Phase Rotation for 320 MHz Non-HT Duplicate Transmission and Pre-EHT modulated Fields", doc.: IEEE 802.11-21/0129r0, Jan. 4, 2021, total 29 pages.

* cited by examiner

INFORMATION TRANSMISSION METHOD AND APPARATUS

CROSS-REFERENCE TO RELATED APPLICATIONS

This application is a continuation of International Application No. PCT/CN2021/135140, filed on Dec. 2, 2021, which claims priority to Chinese Patent Application No. 202011569822.3, filed on Dec. 26, 2020. The disclosures of the aforementioned applications are hereby incorporated by reference in their entireties.

TECHNICAL FIELD

This application relates to the field of communication technologies, and in particular, to an information transmission method and an apparatus.

BACKGROUND

An orthogonal frequency division multiplexing (OFDM) technology is a multi-carrier modulation technology. The OFDM technology has advantages of high spectral efficiency, anti-multipath fading, and the like, but it also has a disadvantage of a high peak to average power ratio (PAPR). Because superposition of a plurality of sub-carriers in OFDM leads to a large peak signal, a high power amplifier requires a large linear dynamic range. This increases costs of the high power amplifier and also reduces efficiency of the high power amplifier. If a peak value exceeds a linear dynamic range of the high power amplifier, in-band distortion and out-of-band dispersion are caused. Therefore, PAPR reduction is a key technology to an OFDM system and has great significance.

Currently, the Institute of Electrical and Electronics Engineers (IEEE) is discussing a next-generation 802.11be standard after 802.11ax. Compared with the previous 802.11ax standard, the 802.11be standard supports extremely high throughput (EHT) data transmission. The 802.11be standard supports a maximum transmission bandwidth of 320 MHz. A PAPR problem is more serious for the 320 MHz bandwidth. Therefore, how to reduce a PAPR for the 320 MHz bandwidth is an urgent problem to be resolved.

SUMMARY

This application provides an information transmission method and apparatus, to reduce a PAPR for a 320 MHz bandwidth.

According to a first aspect, an information transmission method is provided, including: A transmit device generates a physical layer protocol data unit (PPDU) of a 320 MHz bandwidth, where some or all fields of the PPDU are rotated in the 320 MHz bandwidth based on a rotation factor sequence, the 320 MHz bandwidth includes sixteen 20 MHz sub-channels, the rotation factor sequence includes 16 rotation factors, and each 20 MHz sub-channel corresponds to one rotation factor. The transmit device sends the PPDU. Based on the foregoing technical solution, the some or all fields of the 320 MHz PPDU are rotated in the 320 MHz bandwidth based on the rotation factor sequence. Accordingly, PAPRs of some or all fields of a PPDU of a large bandwidth can be reduced based on the rotation factor sequence.

In a possible design, all the fields of the PPDU are transmitted in a non-HT duplicate mode.

In a possible design, all the fields of the PPDU are rotated based on the rotation factor sequence.

In a possible design, the some fields of the PPDU are duplicated and transmitted on a per-20 MHz sub-channel basis.

In a possible design, the some fields of the PPDU are rotated based on the rotation factor sequence.

In a possible design, the some fields of the PPDU include one or more of the following fields: an L-STF, an L-LTF, an L-SIG, an RL-SIG, a U-SIG, or an EHT-SIG.

In a possible design, the rotation factor sequence is a target sequence. Alternatively, the rotation factor sequence is a sequence obtained by performing a target operation on the target sequence. The target operation includes one or more of the following: overall negation, reverse sequence arrangement, or alternative negation. Based on this design, the rotation factor sequence provided in this application can more effectively reduce a PAPR of a PPDU of a 320 MHz bandwidth than a rotation factor sequence [1, −1, −1, −1, 1, −1, −1, −1, −1, 1, 1, 1, −1, 1, 1, 1] provided in a related technology.

Optionally, the target sequence is one of the following:
[1, 1, 1, 1, 1, −1, 1, 1, −1, −1, −1, 1, 1, −1, 1, −1];
[1, 1, 1, −1, −1, −1, −1, 1, −1, −1, 1, 1, −1, 1, −1, 1];
[1, 1, 1, 1, −1, −1, −1, −1, 1, −1, 1, −1, −1, 1, 1, −1];
[1, 1, 1, 1, −1, 1, −1, 1, −1, −1, 1, 1, 1, −1, −1];
[1, 1, 1, −1, 1, −1, 1, −1, 1, 1, −1, 1, 1, −1, −1];
[1, 1, 1, 1, 1, −1, −1, −1, 1, −1, 1, −1, −1, 1, −1, −1]; or
[1, 1, −1, −1, −1, 1, −1, −1, −1, 1, −1, 1, 1, −1, 1].

In a possible design, the rotation factor sequence is a target sequence. Alternatively, the rotation factor sequence is a sequence obtained by performing overall negation on the target sequence. Based on this design, the rotation factor sequence provided in this application can more effectively reduce a PAPR of a PPDU of a 320 MHz bandwidth than a rotation factor sequence [1, −1, −1, −1, 1, −1, −1, −1, −1, 1, 1, 1, −1, 1, 1, 1] provided in a related technology. In addition, the rotation factor sequence provided in this design does not affect a related channel smoothing operation performed by a receive device on content of an 8o MHz sub-channel.

Optionally, the target sequence is one of the following:
[1, −1, −1, −1, 1, −1, −1, −1, 1, −1, −1, −1, −1, 1, 1, 1]; or
[1, −1, −1, −1, −1, 1, 1, 1, −1, 1, 1, 1, −1, 1, 1, 1].

According to a second aspect, an information transmission method is provided, including: A receive device receives a PPDU of a 320 MHz bandwidth, where some or all fields of the PPDU are rotated in the 320 MHz bandwidth based on a rotation factor sequence, the 320 MHz bandwidth includes sixteen 20 MHz sub-channels, the rotation factor sequence includes 16 rotation factors, and each 20 MHz sub-channel corresponds to one rotation factor. The receive device parses the PPDU. Based on the foregoing technical solution, the some or all fields of the 320 MHz PPDU are rotated in the 320 MHz bandwidth based on the rotation factor sequence. Accordingly, PAPRs of some or all fields of a PPDU of a large bandwidth can be reduced based on the rotation factor sequence.

In a possible design, the parsing the PPDU includes: performing rotation recovery on the some or all fields of the PPDU in the 320 MHz bandwidth based on a rotation recovery factor sequence corresponding to the rotation factor sequence, to obtain a PPDU before rotation. Rotation recovery factors included in the rotation recovery factor sequence are in a one-to-one correspondence with the rotation factors in the rotation factor sequence.

In a possible design, all the fields of the PPDU are received in a non-HT duplicate mode.

In a possible design, all the fields of the PPDU are rotated based on the rotation factor sequence.

In a possible design, the some fields of the PPDU are received on a per-20 MHz sub-channel basis.

In a possible design, the some fields of the PPDU are rotated based on the rotation factor sequence.

In a possible design, the some fields of the PPDU include one or more of the following fields: an L-STF, an L-LTF, an L-SIG, an RL-SIG, a U-SIG, or an EHT-SIG.

In a possible design, the rotation factor sequence is a target sequence. Alternatively, the rotation factor sequence is a sequence obtained by performing a target operation on the target sequence. The target operation includes one or more of the following: overall negation, reverse sequence arrangement, or alternative negation. Based on this design, the rotation factor sequence provided in this application can more effectively reduce a PAPR of a PPDU of a 320 MHz bandwidth than a rotation factor sequence [1, −1, −1, −1, 1, −1, −1, −1, −1, 1, 1, 1, −1, 1, 1, 1] provided in a related technology.

Optionally, the target sequence is one of the following:
[1, 1, 1, 1, −1, 1, 1, −1, −1, −1, 1, 1, −1, 1, −1];
[1, 1, 1, −1, −1, −1, −1, 1, −1, −1, 1, 1, −1, 1, −1, 1];
[1, 1, 1, 1, −1, −1, −1, −1, 1, −1, 1, −1, −1, 1, 1, −1];
[1, 1, 1, 1, 1, −1, 1, −1, 1, −1, −1, 1, 1, 1, −1, −1];
[1, 1, 1, 1, −1, 1, −1, 1, −1, 1, 1, −1, 1, 1, −1, −1];
[1, 1, 1, 1, 1, −1, −1, −1, 1, −1, 1, −1, −1, 1, −1, −1]; or
[1, 1, 1, −1, −1, −1, 1, −1, −1, −1, 1, −1, 1, 1, −1, 1].

In a possible design, the rotation factor sequence is a target sequence. Alternatively, the rotation factor sequence is a sequence obtained by performing overall negation on the target sequence. Based on this design, the rotation factor sequence provided in this application can more effectively reduce a PAPR of a PPDU of a 320 MHz bandwidth than a rotation factor sequence [1, −1, −1, −1, 1, −1, −1, −1, −1, 1, 1, 1, −1, 1, 1, 1] provided in a related technology. In addition, the rotation factor sequence provided in this design does not affect a related channel smoothing operation performed by a receive device on content of an 80 MHz sub-channel.

Optionally, the target sequence is one of the following:
[1, −1, −1, −1, 1, −1, −1, −1, 1, −1, −1, −1, −1, 1, 1, 1]; or
[1, −1, −1, −1, −1, 1, 1, 1, −1, 1, 1, 1, −1, 1, 1, 1].

According to a third aspect, an information transmission method is provided, including: A transmit device generates a PPDU of a 320 MHz bandwidth, where subcarriers that are in the 320 MHz bandwidth and that carry some or all fields of the PPDU are rotated based on a rotation factor. The transmit device sends the PPDU. Based on the foregoing technical solution, the subcarriers that are in the 320 MHz bandwidth and that carry the some or all fields of the PPDU are rotated based on the rotation factor. Accordingly, PAPRs of some or all fields of a PPDU of a large bandwidth can be reduced.

In a possible design, all the fields of the PPDU are transmitted in a non-HT duplicate mode.

In a possible design, the subcarriers that carry all the fields of the PPDU are rotated based on a rotation factor sequence.

In a possible design, the some fields of the PPDU are duplicated and transmitted on a per-20 MHz sub-channel basis.

In a possible design, the subcarriers that carry the some fields of the PPDU are rotated based on the rotation factor sequence.

In a possible design, for a correspondence between a subcarrier and a rotation factor, refer to any one of the following Formula (1-1) to Formula (9-1).

According to a fourth aspect, an information transmission method is provided, including: A receive device receives a PPDU of a 320 MHz bandwidth, where subcarriers that are in the 320 MHz bandwidth and that carry some or all fields of the PPDU are rotated based on a rotation factor. The receive device parses the PPDU. Based on the foregoing technical solution, the subcarriers that are in the 320 MHz bandwidth and that carry the some or all fields of the PPDU are rotated based on the rotation factor. Accordingly, PAPRs of some or all fields of a PPDU of a large bandwidth can be reduced.

In a possible design, the parsing the PPDU includes: performing, based on a rotation recovery factor, rotation recovery on the subcarriers that carry the some or all fields of the PPDU, to obtain a PPDU before rotation. A product of the rotation factor of the subcarriers and the rotation recovery factor of the subcarriers is 1.

In a possible design, all the fields of the PPDU are received in a non-HT duplicate mode.

In a possible design, the subcarriers that carry all the fields of the PPDU are rotated based on a rotation factor sequence.

In a possible design, the some fields of the PPDU are received on a per-20 MHz sub-channel basis.

In a possible design, the subcarriers that carry the some fields of the PPDU are rotated based on the rotation factor sequence.

In a possible design, for a correspondence between a subcarrier and a rotation factor, refer to any one of the following Formula (1-1) to Formula (9-1).

According to a fifth aspect, a communication apparatus is provided, including a processing module and a communication module. The processing module is configured to generate a PPDU of a 320 MHz bandwidth. Some or all fields of the PPDU are rotated in the 320 MHz bandwidth based on a rotation factor sequence. The 320 MHz bandwidth includes sixteen 20 MHz sub-channels. The rotation factor sequence includes 16 rotation factors. Each 20 MHz sub-channel corresponds to one rotation factor. The communication module is configured to send the PPDU.

In a possible design, all the fields of the PPDU are transmitted in a non-HT duplicate mode.

In a possible design, all the fields of the PPDU are rotated based on the rotation factor sequence.

In a possible design, the some fields of the PPDU are duplicated and transmitted on a per-20 MHz sub-channel basis.

In a possible design, the some fields of the PPDU are rotated based on the rotation factor sequence.

In a possible design, the some fields of the PPDU include one or more of the following fields: an L-STF, an L-LTF, an L-SIG, an RL-SIG, a U-SIG, or an EHT-SIG.

In a possible design, the rotation factor sequence is a target sequence. Alternatively, the rotation factor sequence is a sequence obtained by performing a target operation on the target sequence. The target operation includes one or more of the following: overall negation, reverse sequence arrangement, or alternative negation.

Optionally, the target sequence is one of the following:
[1, 1, 1, 1, 1, −1, 1, 1, −1, −1, −1, 1, 1, −1, 1, −1];
[1, 1, 1, −1, −1, −1, −1, 1, −1, −1, 1, 1, −1, 1, −1, 1];
[1, 1, 1, 1, −1, −1, −1, −1, 1, −1, 1, −1, −1, 1, 1, −1];
[1, 1, 1, 1, 1, −1, 1, −1, 1, −1, −1, 1, 1, 1, −1, −1];
[1, 1, 1, 1, −1, 1, −1, 1, −1, 1, 1, −1, 1, 1, −1, −1];
[1, 1, 1, 1, 1, −1, −1, −1, 1, −1, 1, −1, −1, 1, −1, −1]; or
[1, 1, 1, −1, −1, −1, 1, −1, −1, −1, 1, −1, 1, 1, −1, 1].

In a possible design, the rotation factor sequence is a target sequence. Alternatively, the rotation factor sequence is a sequence obtained by performing overall negation on the target sequence.

Optionally, the target sequence is one of the following:
[1, −1, −1, −1, 1, −1, −1, −1, 1, −1, −1, −1, −1, 1, 1, 1]; or
[1, −1, −1, −1, −1, 1, 1, 1, −1, 1, 1, 1, −1, 1, 1, 1].

According to a sixth aspect, a communication apparatus is provided, including a processing module and a communication module. The communication module is configured to receive a PPDU of a 320 MHz bandwidth. Some or all fields of the PPDU are rotated in the 320 MHz bandwidth based on a rotation factor sequence. The 320 MHz bandwidth includes sixteen 20 MHz sub-channels. The rotation factor sequence includes 16 rotation factors. Each 20 MHz sub-channel corresponds to one rotation factor. The processing module is configured to parse the PPDU.

In a possible design, the processing module is specifically configured to perform rotation recovery on the some or all fields of the PPDU in the 320 MHz bandwidth based on a rotation recovery factor sequence corresponding to the rotation factor sequence, to obtain a PPDU before rotation. Rotation recovery factors included in the rotation recovery factor sequence are in a one-to-one correspondence with the rotation factors in the rotation factor sequence.

In a possible design, all the fields of the PPDU are received in a non-HT duplicate mode.

In a possible design, all the fields of the PPDU are rotated based on the rotation factor sequence.

In a possible design, the some fields of the PPDU are received on a per-20 MHz sub-channel basis.

In a possible design, the some fields of the PPDU are rotated based on the rotation factor sequence.

In a possible design, the some fields of the PPDU include one or more of the following fields: an L-STF, an L-LTF, an L-SIG, an RL-SIG, a U-SIG, or an EHT-SIG.

In a possible design, the rotation factor sequence is a target sequence. Alternatively, the rotation factor sequence is a sequence obtained by performing a target operation on the target sequence. The target operation includes one or more of the following: overall negation, reverse sequence arrangement, or alternative negation.

Optionally, the target sequence is one of the following:
[1, 1, 1, 1, 1, −1, 1, 1, −1, −1, −1, 1, 1, −1, 1, −1];
[1, 1, 1, −1, −1, −1, −1, 1, −1, −1, 1, 1, −1, 1, −1, 1];
[1, 1, 1, 1, −1, −1, −1, −1, 1, −1, 1, −1, −1, 1, 1, −1];
[1, 1, 1, 1, 1, −1, 1, −1, 1, −1, −1, 1, 1, 1, −1, −1];
[1, 1, 1, 1, −1, 1, −1, 1, −1, 1, 1, −1, 1, 1, −1, −1];
[1, 1, 1, 1, 1, −1, −1, −1, 1, −1, 1, −1, −1, 1, −1, −1]; or
[1, 1, 1, −1, −1, −1, 1, −1, −1, −1, 1, −1, 1, 1, −1, 1].

In a possible design, the rotation factor sequence is a target sequence. Alternatively, the rotation factor sequence is a sequence obtained by performing overall negation on the target sequence.

Optionally, the target sequence is one of the following:
[1, −1, −1, −1, 1, −1, −1, −1, 1, −1, −1, −1, −1, 1, 1, 1]; or
[1, −1, −1, −1, −1, 1, 1, 1, −1, 1, 1, 1, −1, 1, 1, 1].

According to a seventh aspect, a communication apparatus is provided, including a processing module and a communication module. The processing module is configured to generate a PPDU of a 320 MHz bandwidth. Subcarriers that are in the 320 MHz bandwidth and that carry some or all fields of the PPDU are rotated based on a rotation factor. The communication module is configured to send the PPDU.

In a possible design, all the fields of the PPDU are transmitted in a non-HT duplicate mode.

In a possible design, the subcarriers that carry all the fields of the PPDU are rotated based on a rotation factor sequence.

In a possible design, the some fields of the PPDU are duplicated and transmitted on a per-20 MHz sub-channel basis.

In a possible design, the subcarriers that carry the some fields of the PPDU are rotated based on the rotation factor sequence.

In a possible design, for a correspondence between a subcarrier and a rotation factor, refer to any one of the following Formula (1-1) to Formula (9-1).

According to an eighth aspect, a communication apparatus is provided, including a processing module and a communication module. The communication module is configured to receive a PPDU of a 320 MHz bandwidth. Subcarriers that are in the 320 MHz bandwidth and that carry some or all fields of the PPDU are rotated based on a rotation factor. The processing module is configured to parse the PPDU.

In a possible design, the processing module is specifically configured to perform, based on a rotation recovery factor, rotation recovery on the subcarriers that carry the some or all fields of the PPDU, to obtain a PPDU before rotation. A product of the rotation factor of the subcarriers and the rotation recovery factor of the subcarriers is 1.

In a possible design, all the fields of the PPDU are received in a non-HT duplicate mode.

In a possible design, the subcarriers that carry all the fields of the PPDU are rotated based on a rotation factor sequence.

In a possible design, the some fields of the PPDU are received on a per-20 MHz sub-channel basis.

In a possible design, the subcarriers that carry the some fields of the PPDU are rotated based on the rotation factor sequence.

In a possible design, for a correspondence between a subcarrier and a rotation factor, refer to any one of the following Formula (1-1) to Formula (9-1).

According to a ninth aspect, a communication apparatus is provided, including a processor and a transceiver. The processor is configured to perform the generating operation in the method according to the first or third aspect, the transceiver is configured to perform the sending operation in the method according to the first or third aspect.

According to a tenth aspect, a communication apparatus is provided, including a processor and a transceiver. The processor is configured to perform the parsing operation in the method according to the second or fourth aspect, the transceiver is configured to perform the receiving operation in the method according to the second or fourth aspect.

According to an eleventh aspect, a computer-readable storage medium is provided. The computer-readable storage medium stores instructions. When the instructions are run on a computer, the computer is enabled to perform the information transmission method according to any one of the first to fourth aspects or the possible implementations of the first to fourth aspects.

According to a twelfth aspect, a computer program product including instructions is provided. When the computer program product runs on a computer, the computer is enabled to perform the information transmission method according to any one of the first to fourth aspects or the possible implementations of the first to fourth aspects.

According to a thirteenth aspect, a chip is provided, including a processing circuit and a transceiver pin. The processing circuit is configured to perform the generating operation in the method according to the first or third aspect. The transceiver pin is configured to perform the sending operation in the method according to the first or third aspect.

According to a fourteenth aspect, a chip is provided, including a processing circuit and a transceiver pin. The processing circuit is configured to perform the parsing operation in the method according to the second or fourth aspect. The transceiver pin is configured to perform the receiving operation in the method according to the second or fourth aspect.

It may be understood that any communication apparatus, chip, computer storage medium, or computer program product provided above is configured to perform the corresponding method provided above. Therefore, for beneficial effect that can be achieved by the communication apparatus, chip, computer storage medium, or computer program product, refer to beneficial effect in the corresponding method provided above. Details are not described herein again.

DETAILED DESCRIPTION OF ILLUSTRATIVE EMBODIMENTS

Figure 1:
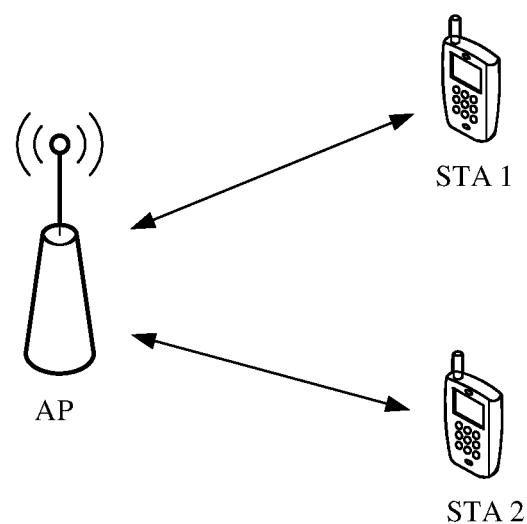
FIG. 1 is a schematic diagram of a structure of a communication system according to an embodiment of this application.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

In this application, the word such as "example" or "for example" is used to represent giving an example, an illustration, or a description. Any embodiment or design scheme described as "an example" or "for example" in this application should not be explained as being more preferred or having more advantages than another embodiment or design scheme. Exactly, use of the word "an example" or "for example" or the like is intended to present a relative concept in a specific manner.

It should be understood that embodiments of this application may be applied to various communication systems, for example, a global system for mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5G communication system, or a system complying with an IEEE 802.11 standard. For example, the IEEE 802.11 standard includes but is not limited to the 802.11be standard or a next-generation 802.11 standard.

The following embodiments are mainly described from a perspective of a communication system complying with the 802.11 standard. Application scenarios of the technical solutions of this application include: communication between an access point (AP) and a station (STA), communication between APs, and communication between STAs, and the like.

The access point may be an access point used by a terminal device (such as a mobile phone) to access a wired (or wireless) network, and is mainly deployed at home, in a building, and in a campus. A typical coverage radius is dozens of meters to hundreds of meters. Certainly, the access point may alternatively be deployed outdoors. The access point is equivalent to a bridge that connects the wired network and the wireless network. A main function of the access point is to connect various wireless network clients together and then connect the wireless network to the Ethernet. Specifically, the access point may be a terminal device (for example, a mobile phone) or a network device (for example, a router) with a wireless-fidelity (Wi-Fi) chip. The access point may be a device that supports the 802.11be standard. Alternatively, the access point may be a device that supports a plurality of wireless local area network (WLAN) standards of the 802.11 family such as the 802.11ax standard, the 802.11ac standard, the 802.11n standard, the 802.11g standard, the 802.11b standard, and the 802.11a standard. The access point in this application may be a high-efficiency (HE) AP, an extremely high throughput (EHT) AP, or an access point applicable to a future generation Wi-Fi standard.

The station may be a wireless communication chip, a wireless sensor, a wireless communication terminal, or the like, and may also be referred to as user equipment. For example, the station may be a mobile phone, a tablet computer, a set-top box, a smart television set, a smart wearable device, a vehicle-mounted communication device, a computer, or the like that supports a Wi-Fi communication function. Optionally, the station may support the 802.11be standard. The station may also support a plurality of wireless local area network (WLAN) standards of the 802.11 family such as the 802.11be standard, the 802.11ax standard, the 802.11ac standard, the 802.11n standard, the 802.11g standard, the 802.11b standard, and the 802.11a standard.

For example, the access point and the station may be devices used in an Internet of vehicles, Internet of things nodes, sensors, or the like in an Internet of things (IoT), smart cameras, smart remote controls, smart water or electricity meters, or the like in a smart home, or sensors in a smart city.

In an embodiment of this application, communication between an AP and a STA is used as an example for description. As shown in FIG. 1, an AP performs wireless communication with a STA 1 and a STA 2. It should be understood that a method described in embodiments of this application is also applicable to communication between APs, communication between STAs, and the like.

A structure of each of the AP and the STA in embodiments of this application may include a media access control (MAC) layer and a physical (PHY) layer. The AP and the STA may perform information transmission by using a physical layer protocol data unit (PPDU). In addition, a frame structure of the PPDU varies with a wireless communication protocol used by the AP and the STA.

Figure 2:
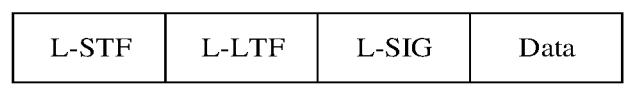
FIG. 2 is a schematic diagram of a frame structure of a PPDU according to an embodiment of this application.

For example, when a wireless communication protocol used by the AP and the STA is 802.11a, as shown in FIG. 2, a frame structure of the PPDU includes a legacy short training field (L-STF), a legacy long training field (L-LTF), a legacy signal field (L-SIG), and a data field (data). It should be noted that the L-STF, the L-LTF, and the L-SIG in the foregoing fields may be referred to as legacy preambles.

It should be noted that the frame structure of the PPDU in 802.11a constitutes no limitation on embodiments of this application. In other words, the frame structure of the PPDU provided in this embodiment of this application may be the same as or different from a frame structure shown in FIG. 2.

802.11a is the first-generation Wi-Fi standard that uses an OFDM modulation scheme. The standard supports a maximum system bandwidth of 20 MHz and includes 52 OFDM subcarriers, among which 48 subcarriers are used to transmit data and 4 subcarriers are pilot subcarriers (pilot carrier). A maximum transmission rate is only 54 Mbit/s. Therefore, a mode of sending data according to the 802.11a standard is referred to as non-high throughput transmission (Non-HT transmission).

Subsequently, the 802.11n standard was developed, which greatly improves the maximum Wi-Fi transmission rate. Therefore, the 802.11n standard is also referred to as the high throughput (high throughput, HT) WLAN standard. The standard may be compatible with the previous-generation 802.11a standard. In other words, an HT device may communicate with a non-HT device in a non-HT mode. Because a maximum bandwidth supported by the 802.11n standard is 40 MHz, when a signal is sent in the non-HT mode, simultaneously sending the signal on two 20 MHz channels causes a high PAPR. Therefore, in the 802.11 standard, phase rotation by 90 degrees is performed on subcarriers in a 20 MHz channel with a higher frequency. In other words, each subcarrier in an upper half of the bandwidth is multiplied by a unit imaginary number j.

The subsequent 802.11ac and 802.11ax standards further expand bandwidths to 80 MHz and 160 MHz. The next-generation standards are still compatible with a conventional 802.11a device. Therefore, data may be simultaneously sent on more 20 MHz sub-channels in the non-HT mode. To reduce a high PAPR caused by simultaneously sending a same signal on a plurality of channels, the standards separately define a rotation coefficient corresponding to a carrier on each 20 MHz sub-channel in 80 MHz and 160 MHz. Specifically, when the 80 MHz bandwidth is used for sending, rotation coefficients corresponding to four 20 MHz sub-channels are respectively 1, −1, −1, and −1. When the 160 MHz bandwidth is used for sending, rotation coefficients corresponding to eight 20 MHz sub-channels are respectively 1, −1, −1, −1, 1, −1, −1, and −1.

The next-generation 802.11 EHT standard supports a maximum bandwidth of 320 MHz. In the new standard, to be compatible with a conventional device, some management frames, such as RTS, CTS, and NDPA frames, are still sent in the non-HT mode. For the 320 MHz bandwidth, rotation coefficients corresponding to subcarriers on sixteen 20 MHz sub-channels when the non-HT sending mode is used need to be designed in the industry. In addition, because the next-generation 802.11 standard supports channel puncturing, some sub-channels in the 320 MHz bandwidth may be punctured and do not send data. This brings more difficulties to design of a rotation coefficient for the 320 MHz bandwidth.

Figure 3:
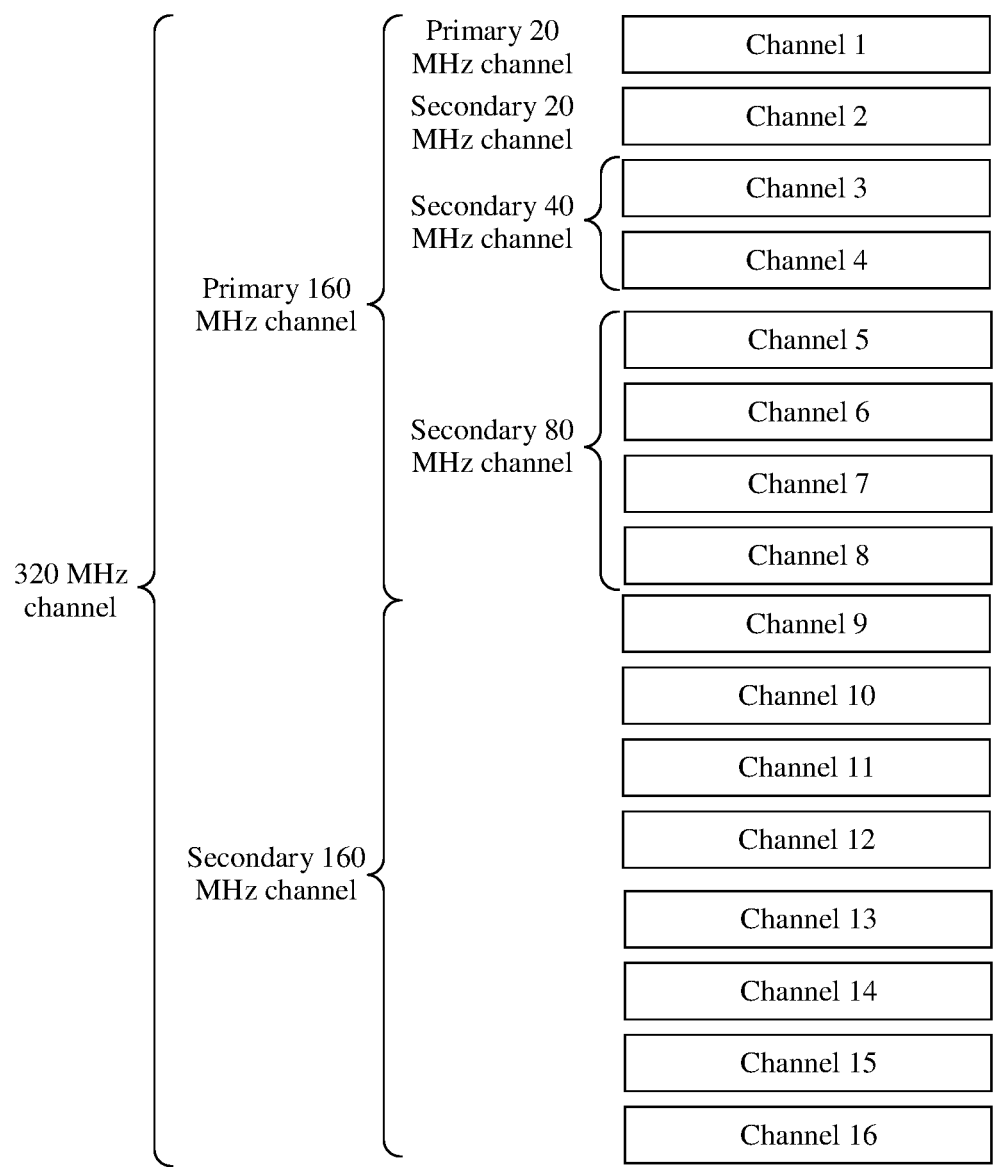
FIG. 3 is a schematic diagram of distribution of a channel of a 320 MHz bandwidth according to an embodiment of this application.

For example, channel distribution of a 320 MHz bandwidth may be shown in FIG. 3. The 320 MHz channel may be divided into sixteen 20 MHz channels. The sixteen 20 MHz channels may be sequentially numbered from a high frequency to a low frequency, or may be sequentially numbered from a low frequency to a high frequency. For example, in FIG. 3, a channel 1 may be used as a primary 20 MHz channel, and a channel 2 may be used as a secondary 20 MHz channel. The channel 1 and the channel 2 may be aggregated as a primary 40 MHz channel. A channel 3 and a channel 4 may be aggregated as a secondary 40 MHz channel. The channel 1 to the channel 4 may be aggregated as a primary 80 MHz channel. A channel 5 to a channel 8 may be aggregated as a secondary 80 MHz channel. The channel 1 to the channel 8 may be aggregated as a primary 160 MHz channel. A channel 9 to a channel 16 may be aggregated as a secondary 160 MHz channel. It should be noted that the primary 20 MHz channel is not necessarily a 20 MHz channel located at the beginning. For example, the channel 3 may be used as the primary 20 MHz channel, the channel 4 may be used as the secondary 20 MHz channel, the channel 3 and the channel 4 may be aggregated as the primary 40 MHz channel, the channel 1 and the channel 2 may be aggregated as the secondary 40 MHz channel, the channel 1 to the channel 4 may be aggregated as the primary 80 MHz channel, the channel 5 to the channel 8 may be aggregated as the secondary 80 MHz channel, the channel 1 to the channel 8 may be aggregated as the primary 160 MHz channel, and the channel 9 to the channel 16 may be aggregated as the secondary 160 MHz channel. The secondary channel may alternatively have another name, for example, a slave channel or an auxiliary channel. This embodiment of this application is not limited thereto.

Figure 4:
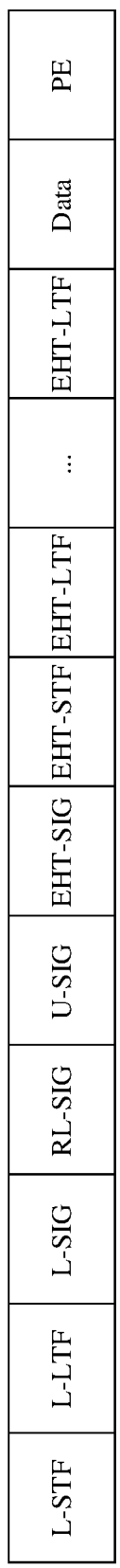
FIG. 4 is a schematic diagram of a frame structure of an EHT PPDU according to an embodiment of this application.

As shown in FIG. 4, a frame structure of an extreme high throughput (extremely high throughput, EHT) PPDU in the 802.11be standard may include an L-STF, an L-LTF, an L-SIG, a repeated L-SIG (repeated L-SIG, RL-SIG), a universal signal field (U-SIG), an EHT-SIG, an EHT-STF, an EHT-LTF, a data field, and a data packet extension (PE) field.

The L-STF, the L-LTF, the L-SIG, the RL-SIG, and the U-SIG included in the EHT PPDU are duplicated and transmitted on a per-20 MHz sub-channel basis.

A non-HT duplicate transmission mode indicates that all fields of a PPDU in a non-HT format are duplicated and transmitted on a per-20 MHz sub-channel basis in a bandwidth greater than 20 MHz. A mode in which some fields of the PPDU are duplicated and transmitted on a per-20 MHz sub-channel basis is different from the non-HT duplicate transmission mode. For example, in the non-HT duplicate transmission mode, some fields of the EHT PPDU are duplicated and transmitted on a per-20 MHz sub-channel basis, which has the following features: (1) A rate of the L-SIG field in the EHT PPDU is a fixed value, and a value of a length is set in a special manner to distinguish between protocol versions. (2) For the EHT PPDU, four subcarriers −28, −27, 27, and 28 of the L-SIG and the RL-SIG on each 20 MHz sub-channel are no longer 0, but are fixed values [−1, −1, −1, 1]. (3) For the EHT PPDU, subcarriers −28, −27, 27, and 28 of the U-SIG and the EHT-SIG on each 20 MHz channel are no longer 0, but are used to transmit additional information.

Because the L-STF, the L-LTF, the L-SIG, the RL-SIG, and the U-SIG included in the EHT PPDU are duplicated and transmitted on a per-20 MHz sub-channel basis, an EHT pre-modulation field of the EHT PPDU also has a high PAPR. Therefore, to reduce PAPRs of these fields, a rotation factor sequence [1, −1, −1, −1, 1, −1, −1, −1, −1, 1, 1, 1, −1, 1, 1, 1] is provided in a related technology. However, the rotation factor sequence cannot effectively reduce PAPRs of these fields.

It can be learned that a solution that can effectively reduce PAPRs of some fields or all fields of a PPDU of a 320 MHz bandwidth is urgently needed in the industry.

Figure 5:
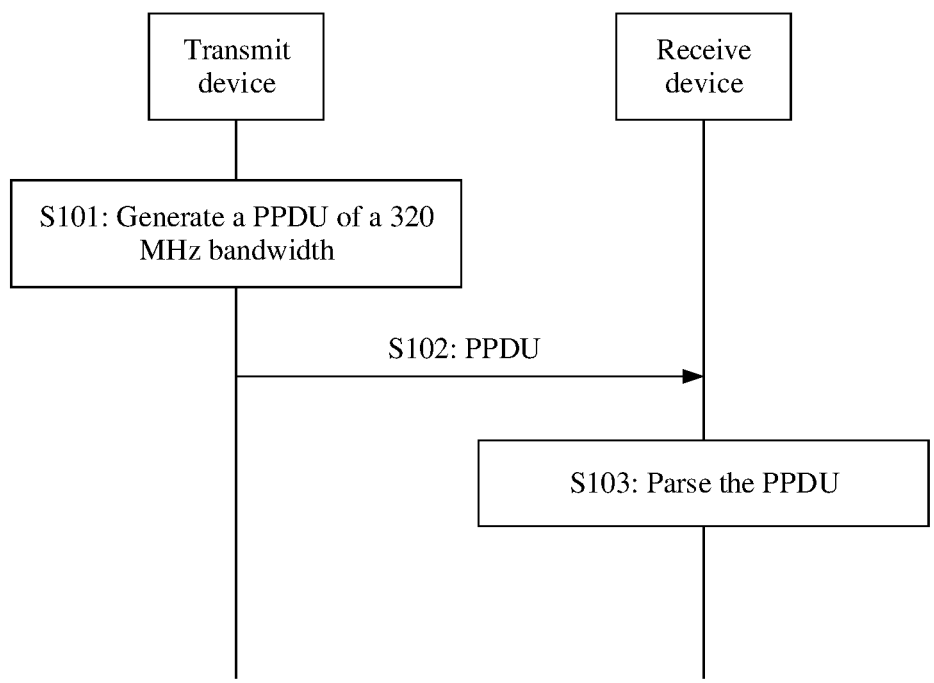
FIG. 5 is a flowchart of an information transmission method according to an embodiment of this application.

In this case, an embodiment of this application provides an information transmission method. As shown in FIG. 5, the method includes the following steps.

S101: A transmit device generates a PPDU of a 320 MHz bandwidth.

In a possible design, the 320 MHz bandwidth may be a 320 MHz bandwidth in a non-puncturing pattern. In this case, a transmission bandwidth actually used by the transmit device is 320 MHz.

In another possible design, the 320 MHz bandwidth may be a 320 MHz bandwidth in a puncturing pattern. The 320 MHz bandwidth is also referred to as a nominal 320 MHz bandwidth. In this case, a transmission bandwidth actually used by the transmit device is less than 320 MHz.

The PPDU may be a PPDU in a non-HT format, an EHT PPDU, or a PPDU of another type. This is not limited in this embodiment of this application.

In this embodiment of this application, the PPDU may use any one of a plurality of modulation schemes, for example, a binary phase shift keying (BPSK) modulation scheme, a quadrature phase shift keying (QPSK) modulation scheme, a 16 quadrature amplitude modulation (QAM) scheme, or a 64 QAM modulation scheme.

Optionally, all fields of the PPDU may be duplicated and transmitted in a non-HT mode on the foregoing 320 MHz bandwidth.

For example, the PPDU is a clear to send (CTS) frame, a request to send (RTS) frame, or a null data packet announcement (NDPA) frame, and all the fields (including a preamble field and a data field) of the PPDU are duplicated and transmitted in the non-HT mode.

Optionally, some fields of the PPDU may be duplicated and transmitted on a per-20 MHz sub-channel basis in the foregoing 320 MHz bandwidth. For example, the some fields of the PPDU may be pre-modulation fields. The pre-modulation field is used to carry information that can be interpreted by all devices. For example, for a target receive end, the target receive end may obtain information such as a coding and modulation scheme and a length of a subsequent field of the PPDU based on the pre-modulation field of the PPDU, to facilitate interpretation of subsequent data. A device other than the target receive end may learn, based on the pre-modulation field of the PPDU, information about occupation of a channel by another person and estimated occupation duration, to properly back off, thereby avoiding congestion.

For example, the some fields of the PPDU may be one or more of the following fields: an L-STF, an L-LTF, an L-SIG, an RL-SIG, a U-SIG, or an EHT-SIG. It should be understood that, with evolution of wireless technologies, the some fields of the PPDU may further include a new field included in a PPDU in a next-generation format.

For example, the PPDU is an EHT PPDU, and an L-STF, an L-LTF, an L-SIG, an RL-SIG, a U-SIG, and an EHT-SIG included in the PPDU are duplicated and transmitted on a per-20 MHz sub-channel basis in the 320 MHz bandwidth.

The following describes two manners for reducing a PAPR of the PPDU of the 320 MHz bandwidth. It should be understood that Manner 1 is described from a perspective of a frequency band (for example, 20 MHz), and Manner 2 is described from a perspective of a subcarrier. Manner 1 and Manner 2 are consistent in ideas.

Manner 1: The some or all fields of the PPDU are rotated in the 320 MHz bandwidth based on a rotation factor sequence. The 320 MHz bandwidth may include n X MHz sub-channels, and the rotation factor sequence may include n rotation factors. Each rotation factor corresponds to one X MHz sub-channel. For example, X MHz may be 20 MHz, 40 MHz, or the like. This is not limited.

It should be understood that one or more of the n X MHz sub-channels may be punctured. In other words, one or more of the n X MHz sub-channels may not be used to carry a signal. Based on this, the foregoing 320 MHz bandwidth is a 320 MHz bandwidth in the puncturing pattern.

For example, the 320 MHz bandwidth may include sixteen 20 MHz sub-channels, and the rotation factor sequence includes 16 rotation factors. Each rotation factor may correspond to one 20 MHz sub-channel. It should be understood that when the 320 MHz bandwidth is in the puncturing pattern, one or more 20 MHz sub-channels of the sixteen 20 MHz sub-channels are punctured, and a rotation factor corresponding to a punctured 20 MHz sub-channel in the rotation factor sequence is not used.

That the some or all fields of the PPDU are rotated in the 320 MHz bandwidth based on a rotation factor sequence may include: The some fields of the PPDU are rotated in the 320 MHz bandwidth based on the rotation factor sequence, and fields other than the some fields are not rotated in the 320 MHz bandwidth based on the rotation factor sequence. Alternatively, all the fields of the PPDU are rotated in the 320 MHz bandwidth based on the rotation factor sequence.

Alternatively, that the some or all fields of the PPDU are rotated in the 320 MHz bandwidth based on a rotation factor sequence may be understood as follows: Each field in the some or all fields of the PPDU is rotated in the 320 MHz bandwidth based on the rotation factor sequence. In other words, each field in the some fields of the PPDU is rotated in the sixteen 20 MHz sub-channels based on the rotation factor sequence. Alternatively, each field in all the fields of the PPDU are rotated in the sixteen 20 MHz sub-channels based on the rotation factor sequence.

Optionally, a field that is in the PPDU and that needs to be rotated based on the rotation factor sequence may be a field that is duplicated and transmitted on a per-20 MHz sub-channel basis in the 320 MHz bandwidth. For example, if all the fields of the PPDU are duplicated and transmitted in a non-HT mode on a per-20 MHz sub-channel basis in the 320 MHz bandwidth, all the fields of the PPDU are rotated on a per-20 MHz sub-channel basis in the 320 MHz bandwidth based on the rotation factor sequence. For another example, if the some fields of the PPDU are duplicated and transmitted on a per-20 MHz sub-channel basis in the 320 MHz bandwidth, the some fields of the PPDU are rotated in the 320 MHz bandwidth based on the rotation factor sequence.

Optionally, when the transmit device generates the PPDU of the 320 MHz bandwidth, for the some or all fields of the PPDU, a frequency-domain signal corresponding to the some or all fields carried on each of the n X MHz sub-channels included in the 320 MHz bandwidth may be multiplied by a rotation factor corresponding to the Y MHz sub-channel, to obtain products of frequency-domain signals corresponding to the some or all fields and the rotation factor sequence. Then, inverse fast Fourier transform (IFFT) is performed on the products to obtain time-domain signals corresponding to the some or all fields.

For example, it is assumed that frequency-domain signals corresponding to the some or all fields are [X1, X2, ..., Xn], and the n rotation factors are [K1, K2, ..., Kn]. X1 to Xn respectively represent frequency-domain signals corresponding to the n X MHz sub-channels, and K1 to Kn respectively represent rotation factors corresponding to the n X MHz sub-channels. In this case, the products of the frequency-domain signals corresponding to the some or all fields and the rotation factor sequence may be represented as [X1×K1, X2×K2, ..., Xn×Kn]. The time-domain signals corresponding to the some or all fields may be represented as IFFT [X1×K1, X2×K2, ..., Xn×Kn].

Correspondingly, during calculation of a PAPR of the some or all fields based on the time-domain signals corresponding to the some or all fields, oversampling may be performed on the time-domain signals corresponding to the some or all fields, to obtain analog domain signals. For example, five-times oversampling is performed. It is assumed that a time-domain signal obtained by oversampling is Si, a PAPR may be calculated according to the following formula. In the formula, max represents obtaining a maximum value, and mean represents an averaging operation.

$$PAPR = 10\log_{10}\left(\frac{\max(S_i^2)}{\mathrm{mean}(S_i^2)}\right)$$

In this embodiment of this application, if a field carried on an X MHz sub-channel is multiplied by a non-1 rotation factor, the field on the X MHz sub-channel is rotated.

Optionally, a value range of a rotation factor in the rotation factor sequence may be 1, −1, j, or −j. A rotation angle corresponding to the rotation factor 1 is 0 degrees. A rotation angle corresponding to the rotation factor −1 is 180 degrees. A rotation angle corresponding to the rotation factor j is 90 degrees. A rotation angle corresponding to the rotation factor −j is −90 degrees. It should be understood that the value range of the rotation factor may be limited to a set {1, −1, j, −j}. This facilitates simple implementation of the device and reduces complexity of the device.

Optionally, in a scenario in which X MHz is 20 MHz, one of the following designs may be used for the rotation factor sequence:

Design 1: The rotation factor sequence may be a target sequence. Alternatively, the rotation factor sequence may be a sequence obtained by performing a target operation on the target sequence. The target operation may be one or more of the following: overall negation, reverse sequence arrangement, or alternative negation.

Optionally, based on Design 1, the target sequence is one of the following:
[1, 1, 1, 1, 1, −1, 1, 1, −1, −1, −1, 1, 1, −1, 1, −1];
[1, 1, 1, −1, −1, −1, −1, 1, −1, −1, 1, 1, −1, 1, −1, 1];
[1, 1, 1, 1, −1, −1, −1, −1, 1, −1, 1, −1, −1, 1, 1, −1];
[1, 1, 1, 1, 1, −1, 1, −1, 1, −1, −1, 1, 1, 1, −1, −1];
[1, 1, 1, 1, −1, 1, −1, 1, −1, 1, 1, −1, 1, 1, −1, −1];
[1, 1, 1, 1, −1, −1, −1, 1, −1, 1, −1, −1, 1, −1, −1]; or
[1, 1, 1, −1, −1, −1, 1, −1, −1, −1, 1, −1, 1, 1, −1, 1].

The overall negation indicates performing a negation operation on each element in the sequence. For example, it is assumed that an original sequence is [1, −1, 1, 1, 1], and a sequence obtained after overall negation is performed on the sequence is [−1, 1, −1, −1, −1].

The reverse sequence arrangement indicates that elements in the sequence that are originally arranged from a most significant bit to a least significant bit are rearranged from the least significant bit to the most significant bit. For example, it is assumed that an original sequence is [1, −1, 1, 1, 1], and a sequence obtained after reverse sequence arrangement is performed on the sequence is [1, 1, 1, −1, 1].

The alternative negation has two implementations: Implementation 1: A negation operation is performed on an element of each even item in the sequence. For example, it is assumed that an original sequence is [1, −1, 1, 1, 1], and a sequence obtained after alternative negation is performed on even items in the sequence is [1, 1, 1, −1, 1]. Implementation 2: A negation operation is performed on an element of each odd item in the sequence. For example, it is assumed that an original sequence is [1, −1, 1, 1, 1], and a sequence obtained after alternative negation is performed on odd items in the sequence is [−1, −1, −1, 1, −1].

It should be understood that alternative negation is first performed on even items in a sequence, and then overall negation is performed on the even items, which is equivalent to performing negation on odd items in the sequence.

Design 2: The rotation factor sequence may be a target sequence. Alternatively, the rotation factor sequence may be a sequence obtained by performing overall negation on the target sequence.

Optionally, based on Design 2, the target sequence is one of the following:
[1, −1, −1, −1, 1, −1, −1, −1, 1, −1, −1, −1, −1, 1, 1, 1]; or
[1, −1, −1, −1, −1, 1, 1, 1, −1, 1, 1, 1, −1, 1, 1, 1].

It should be understood that, for an 80 MHz bandwidth, rotation coefficients of four 20 MHz sub-channels in an 80 MHz channel are defined as [1, −1, −1, −1] in a related technology. When a 320 MHz channel is considered as four 80 MHz sub-channels, the four 80 MHz sub-channels are rotated by different phases based on [1, −1, −1, −1] provided in the related technology, to obtain an equivalent rotation factor sequence (that is, the rotation factor sequence provided in Design 2) corresponding to sixteen 20 MHz sub-channels. Therefore, the rotation factor sequence provided in Design 2 is obtained by rotating on each 80 MHz sub-channel, and does not affect a channel smoothing related operation performed by the receive device on content of the 80 MHz sub-channel.

For example, with reference to the foregoing Design 1 and Design 2, Table 1 shows a possible implementation of the rotation factor sequence. It should be understood that one row in Table 1 corresponds to an implementation of the rotation factor sequence.

TABLE 1

| Sequence number | Rotation factor sequence | | | | | | | | | | | | | | | |
|---|---|---|---|---|---|---|---|---|---|---|---|---|---|---|---|---|
| 1  | 1  | 1  | 1  | 1  | 1  | -1 | 1  | 1  | -1 | -1 | -1 | 1  | 1  | -1 | 1  | -1 |
| 2  | -1 | -1 | -1 | -1 | -1 | 1  | -1 | -1 | 1  | 1  | 1  | -1 | -1 | 1  | -1 | 1  |
| 3  | 1  | -1 | 1  | -1 | 1  | 1  | 1  | -1 | -1 | 1  | -1 | -1 | 1  | 1  | 1  | 1  |
| 4  | -1 | 1  | -1 | 1  | -1 | -1 | -1 | 1  | 1  | -1 | 1  | 1  | -1 | -1 | -1 | -1 |
| 5  | -1 | 1  | -1 | 1  | 1  | 1  | -1 | -1 | 1  | -1 | 1  | 1  | 1  | 1  | 1  | 1  |
| 6  | 1  | -1 | 1  | -1 | -1 | -1 | 1  | 1  | -1 | 1  | -1 | -1 | -1 | -1 | -1 | -1 |
| 7  | -1 | -1 | -1 | -1 | 1  | 1  | -1 | 1  | 1  | -1 | -1 | -1 | 1  | -1 | 1  | -1 |
| 8  | 1  | 1  | 1  | 1  | -1 | -1 | 1  | -1 | -1 | 1  | 1  | 1  | -1 | 1  | -1 | 1  |
| 9  | 1  | 1  | 1  | -1 | -1 | 1  | -1 | 1  | -1 | 1  | 1  | -1 | 1  | 1  | -1 | 1  |
| 10 | -1 | -1 | -1 | 1  | 1  | 1  | 1  | -1 | 1  | 1  | 1  | -1 | 1  | 1  | -1 | -1 |
| 11 | 1  | -1 | 1  | 1  | -1 | 1  | -1 | -1 | 1  | 1  | -1 | -1 | 1  | -1 | -1 | -1 |
| 12 | -1 | 1  | -1 | -1 | 1  | -1 | 1  | 1  | -1 | -1 | 1  | 1  | 1  | 1  | 1  | 1  |
| 13 | 1  | -1 | 1  | -1 | 1  | 1  | -1 | 1  | -1 | -1 | -1 | -1 | 1  | 1  | 1  | 1  |
| 14 | -1 | 1  | -1 | 1  | -1 | 1  | 1  | 1  | -1 | 1  | 1  | 1  | 1  | -1 | -1 | -1 |
| 15 | 1  | 1  | 1  | 1  | -1 | -1 | 1  | 1  | 1  | -1 | 1  | -1 | -1 | 1  | -1 | 1  |
| 16 | -1 | -1 | -1 | -1 | 1  | 1  | -1 | -1 | -1 | 1  | -1 | 1  | 1  | -1 | 1  | -1 |
| 17 | 1  | 1  | 1  | 1  | -1 | -1 | -1 | 1  | -1 | 1  | -1 | -1 | 1  | 1  | -1 | 1  |
| 18 | -1 | -1 | -1 | -1 | 1  | 1  | 1  | -1 | 1  | -1 | 1  | 1  | -1 | -1 | 1  | -1 |
| 19 | 1  | -1 | 1  | -1 | 1  | -1 | 1  | 1  | 1  | 1  | 1  | -1 | -1 | 1  | 1  | 1  |
| 20 | -1 | 1  | -1 | 1  | -1 | 1  | -1 | -1 | -1 | -1 | -1 | 1  | 1  | -1 | -1 | -1 |
| 21 | -1 | 1  | 1  | -1 | -1 | 1  | -1 | 1  | -1 | -1 | -1 | -1 | 1  | 1  | 1  | 1  |
| 22 | 1  | -1 | -1 | 1  | 1  | -1 | 1  | -1 | 1  | 1  | 1  | 1  | -1 | -1 | -1 | -1 |
| 23 | -1 | -1 | 1  | 1  | -1 | -1 | -1 | -1 | -1 | 1  | -1 | 1  | 1  | -1 | 1  | 1  |
| 24 | 1  | 1  | -1 | -1 | 1  | 1  | 1  | 1  | 1  | -1 | 1  | -1 | -1 | 1  | -1 | 1  |
| 25 | 1  | 1  | 1  | 1  | 1  | -1 | 1  | -1 | -1 | 1  | -1 | 1  | 1  | 1  | -1 | -1 |
| 26 | -1 | -1 | -1 | -1 | -1 | 1  | -1 | 1  | 1  | -1 | 1  | -1 | -1 | -1 | 1  | 1  |
| 27 | 1  | -1 | 1  | -1 | 1  | 1  | 1  | 1  | 1  | -1 | -1 | 1  | -1 | 1  | -1 | 1  |
| 28 | -1 | 1  | -1 | 1  | -1 | -1 | -1 | -1 | -1 | 1  | 1  | -1 | 1  | -1 | 1  | -1 |
| 29 | -1 | -1 | 1  | 1  | 1  | -1 | -1 | 1  | -1 | 1  | 1  | 1  | -1 | 1  | 1  | 1  |
| 30 | 1  | 1  | -1 | -1 | -1 | 1  | 1  | -1 | 1  | -1 | -1 | -1 | 1  | -1 | -1 | -1 |
| 31 | -1 | 1  | 1  | -1 | 1  | 1  | -1 | -1 | -1 | -1 | -1 | -1 | 1  | -1 | 1  | 1  |
| 32 | 1  | -1 | -1 | 1  | -1 | -1 | 1  | 1  | 1  | 1  | 1  | 1  | -1 | 1  | -1 | 1  |
| 33 | 1  | 1  | 1  | -1 | 1  | -1 | 1  | -1 | 1  | 1  | -1 | 1  | 1  | -1 | 1  | -1 |
| 34 | -1 | -1 | -1 | -1 | 1  | -1 | 1  | -1 | -1 | -1 | 1  | -1 | -1 | 1  | 1  | 1  |
| 35 | 1  | -1 | 1  | -1 | -1 | 1  | 1  | -1 | -1 | -1 | 1  | 1  | 1  | -1 | 1  | 1  |
| 36 | -1 | 1  | -1 | 1  | 1  | -1 | 1  | 1  | 1  | 1  | -1 | -1 | -1 | 1  | -1 | 1  |
| 37 | -1 | -1 | 1  | 1  | -1 | 1  | -1 | 1  | -1 | 1  | -1 | 1  | 1  | 1  | 1  | 1  |
| 38 | 1  | 1  | -1 | -1 | 1  | -1 | 1  | -1 | 1  | -1 | 1  | -1 | -1 | -1 | -1 | -1 |
| 39 | -1 | 1  | 1  | -1 | -1 | 1  | 1  | 1  | 1  | 1  | 1  | -1 | 1  | -1 | 1  | 1  |
| 40 | 1  | -1 | -1 | 1  | 1  | -1 | -1 | -1 | -1 | -1 | -1 | 1  | -1 | 1  | -1 | 1  |
| 41 | 1  | 1  | 1  | 1  | -1 | -1 | -1 | 1  | -1 | -1 | 1  | -1 | 1  | -1 | -1 | -1 |
| 42 | -1 | -1 | -1 | -1 | 1  | 1  | 1  | -1 | 1  | -1 | 1  | -1 | -1 | 1  | 1  | 1  |
| 43 | 1  | -1 | 1  | -1 | 1  | 1  | 1  | 1  | 1  | 1  | -1 | -1 | 1  | -1 | -1 | 1  |
| 44 | -1 | 1  | -1 | 1  | -1 | -1 | -1 | -1 | -1 | -1 | 1  | 1  | -1 | 1  | 1  | -1 |
| 45 | -1 | -1 | 1  | -1 | -1 | 1  | -1 | -1 | -1 | -1 | 1  | 1  | 1  | 1  | 1  | 1  |
| 46 | 1  | 1  | -1 | 1  | 1  | -1 | 1  | -1 | 1  | 1  | -1 | -1 | -1 | -1 | -1 | -1 |
| 47 | -1 | 1  | 1  | 1  | -1 | -1 | 1  | -1 | -1 | 1  | -1 | -1 | 1  | -1 | 1  | 1  |
| 48 | 1  | -1 | -1 | -1 | 1  | 1  | 1  | 1  | 1  | -1 | 1  | -1 | -1 | 1  | -1 | 1  |
| 49 | 1  | 1  | 1  | -1 | -1 | 1  | -1 | -1 | -1 | 1  | -1 | 1  | 1  | -1 | 1  | 1  |
| 50 | -1 | -1 | -1 | 1  | 1  | -1 | 1  | 1  | 1  | -1 | 1  | -1 | -1 | 1  | 1  | 1  |
| 51 | 1  | -1 | 1  | 1  | -1 | 1  | 1  | 1  | 1  | 1  | 1  | -1 | 1  | -1 | -1 | 1  |
| 52 | -1 | 1  | -1 | -1 | 1  | -1 | -1 | -1 | 1  | -1 | -1 | -1 | -1 | 1  | 1  | 1  |
| 53 | 1  | -1 | 1  | -1 | 1  | -1 | -1 | 1  | 1  | -1 | -1 | -1 | -1 | 1  | 1  | 1  |
| 54 | -1 | 1  | -1 | 1  | -1 | 1  | 1  | -1 | 1  | 1  | 1  | 1  | -1 | -1 | -1 | -1 |
| 55 | 1  | 1  | 1  | -1 | -1 | -1 | 1  | -1 | -1 | 1  | -1 | -1 | 1  | 1  | -1 | 1  |
| 56 | -1 | -1 | -1 | 1  | 1  | 1  | -1 | 1  | 1  | -1 | 1  | 1  | -1 | -1 | 1  | -1 |
| 57 | 1  | -1 | -1 | -1 | -1 | 1  | -1 | 1  | -1 | -1 | -1 | -1 | 1  | 1  | 1  | 1  |
| 58 | -1 | 1  | 1  | 1  | -1 | 1  | 1  | 1  | -1 | 1  | 1  | 1  | 1  | -1 | -1 | -1 |
| 59 | 1  | -1 | -1 | -1 | -1 | 1  | 1  | -1 | 1  | 1  | 1  | -1 | 1  | 1  | 1  | 1  |
| 60 | -1 | 1  | 1  | 1  | 1  | -1 | -1 | -1 | 1  | -1 | -1 | 1  | -1 | -1 | -1 | -1 |

As shown in Table 1, rotation factor sequences whose sequence numbers are 2 to 8 are obtained by performing the target operation on a rotation factor sequence whose sequence number is 1. Rotation factor sequences whose sequence numbers are 10 to 16 are obtained by performing the target operation on a rotation factor sequence whose sequence number is 9. Rotation factor sequences whose sequence numbers are 18 to 24 are obtained by performing the target operation on a rotation factor sequence whose sequence number is 17. Rotation factor sequences whose sequence numbers are 26 to 32 are obtained by performing the target operation on a rotation factor sequence whose sequence number is 25. Rotation factor sequences whose sequence numbers are 34 to 40 are obtained by performing the target operation on a rotation factor sequence whose sequence number is 33. Rotation factor sequences whose sequence numbers are 42 to 48 are obtained by performing the target operation on a rotation factor sequence whose sequence number is 41. Rotation factor sequences whose sequence numbers are 50 to 56 are obtained by performing the target operation on a rotation factor sequence whose sequence number is 49. A rotation factor sequence whose sequence number is 58 is obtained by performing overall negation on a rotation factor sequence whose sequence number is 57. A rotation factor sequence whose sequence number is 60 is obtained by performing overall negation on a rotation factor sequence whose sequence number is 59.

It should be understood that a sequence obtained after overall negation, alternative negation, and/or reverse sequence arrangement are/is performed on the target sequence has same effect in reducing a PAPR as that of the target sequence.

For example, Table 2 shows a simulation result of the rotation factor sequences whose sequence numbers are 1, 9, 17, 25, 33, 41, 49, 57, and 59 in Table 1 and a rotation factor sequence [1, −1, −1, −1, 1, −1, −1, −1, −1, 1, 1, 1, 1, −1, 1, 1, 1] provided by a related technology.

For the rotation factor sequences whose sequence numbers are 1, 9, 17, 25, 33, 41, 49, 57, 59 in Table 1 and the rotation factor sequence [1, −1, −1, −1, 1, −1, −1, −1, −1, 1, 1, 1, −1, 1, 1, 1] provided by the related technology, a second column in Table 2 provides a median value of a PAPR when each rotation factor sequence is applied to a PPDU of a 320 MHz bandwidth in the non-puncturing pattern. A third column in Table 2 provides a median value of a worst PAPR when each rotation factor sequence is applied to a PPDU of a 320 MHz bandwidth in a 20 MHz bandwidth mode. A fourth column in Table 2 provides a median value of a worst PAPR when each rotation factor sequence is applied to a PPDU of a 320 MHz bandwidth in a 40 MHz bandwidth mode. It should be understood that the median value of the PAPR is a median value of a plurality of PAPRs calculated through simulation when the PPDU carries random content by using the BPSK modulation scheme.

For the 320 MHz bandwidth, there are sixteen 20 MHz puncturing patterns. Therefore, for the 20 MHz bandwidth mode, the worst PAPR is a worst PAPR in 6 PAPRs respectively corresponding to the sixteen 20 MHz puncturing patterns.

For the 320 MHz bandwidth, there are eight 40 MHz puncturing patterns. Therefore, for the 40 MHz bandwidth mode, the worst PAPR is a worst PAPR in eight PAPRs respectively corresponding to the eight 40 MHz puncturing patterns.

TABLE 2

| PAPR (unit: dB) | No puncturing | 20 MHz puncturing | 40 MHz puncturing |
|---|---|---|---|
| Rotation factor sequence provided by the related technology | 12.1476 | 13.3110 | 12.8074 |
| Rotation factor sequence whose sequence number is 1 | 9.1057 | 10.8747 | 10.9680 |
| Rotation factor sequence whose sequence number is 9 | 9.2655 | 10.8955 | 11.2932 |
| Rotation factor sequence whose sequence number is 17 | 9.4477 | 10.9448 | 10.9922 |
| Rotation factor sequence whose sequence number is 25 | 9.4399 | 11.1188 | 11.1389 |
| Rotation factor sequence whose sequence number is 33 | 9.4388 | 11.0922 | 11.0120 |
| Rotation factor sequence whose sequence number is 41 | 9.6246 | 11.2212 | 11.2522 |
| Rotation factor sequence whose sequence number is 49 | 9.4233 | 11.0954 | 11.2337 |
| Rotation factor sequence whose sequence number is 57 | 10.5908 | 12.1216 | 12.0890 |
| Rotation factor sequence whose sequence number is 59 | 10.6002 | 11.9446 | 12.1159 |

It should be understood that a larger PAPR value of a PPDU indicates worse effect of a rotation factor sequence in reducing a PAPR. It can be learned that the rotation factor sequence provided in embodiments of this application can more effectively reduce a PAPR than the rotation factor sequence provided in the related technology.

With reference to the accompanying drawings, the following compares the rotation factor sequences whose sequence numbers are 1 and 57 with the rotation factor sequence in the related technology. FIG. 6 to FIG. 11 are schematic diagrams of PAPR simulation results. As shown in FIG. 6 to FIG. 11, a horizontal coordinate is a PAPR, and a vertical coordinate is a corresponding cumulative distribution function (CDF). Therefore, FIG. 6 to FIG. 11 may show probability distribution characteristics of PAPRs corresponding to different rotation factor sequences.

As shown in FIG. 6 to FIG. 11, Seq1 represents a rotation factor sequence whose sequence number is 1, Seq57 represents a rotation factor sequence whose sequence number is 57, and prior art seq is the rotation factor sequence [1, −1, −1, −1, 1, −1, −1, −1, −1, 1, 1, 1, −1, 1, 1, 1] provided in the related technology.

Figure 6:
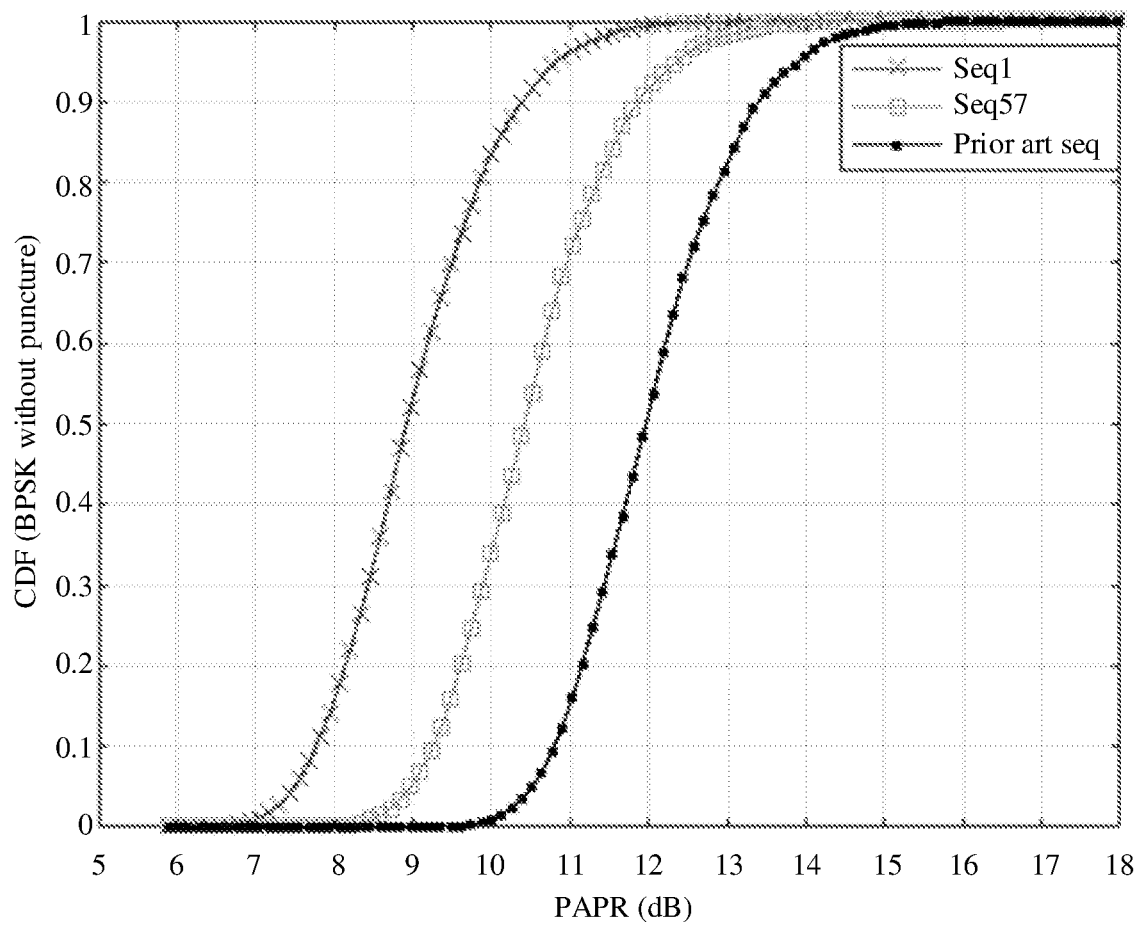
FIG. 6 is a schematic diagram of a simulation result of a PAPR according to an embodiment of this application.
Figure 7:
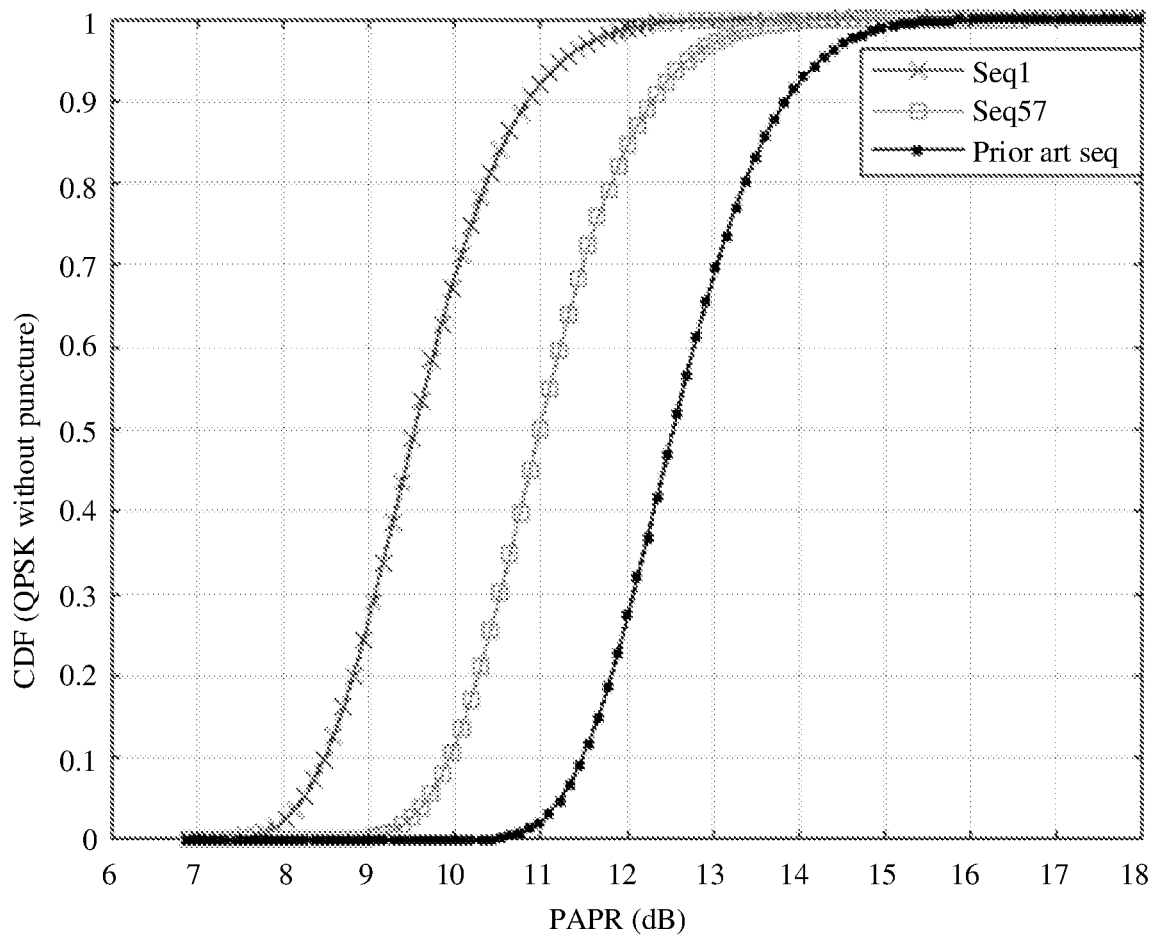
FIG. 7 is a schematic diagram of a simulation result of another PAPR according to an embodiment of this application.
Figure 8:
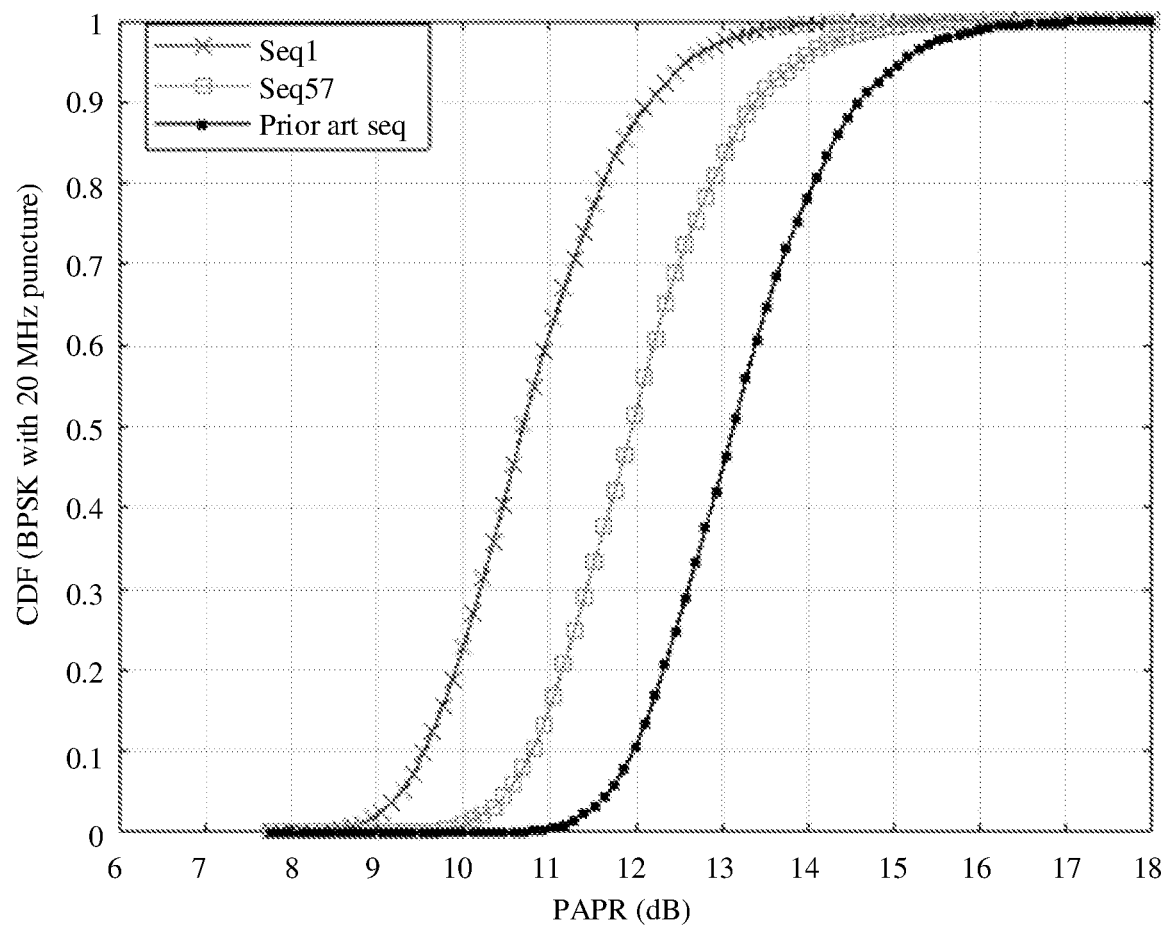
FIG. 8 is a schematic diagram of a simulation result of still another PAPR according to an embodiment of this application.
Figure 9:
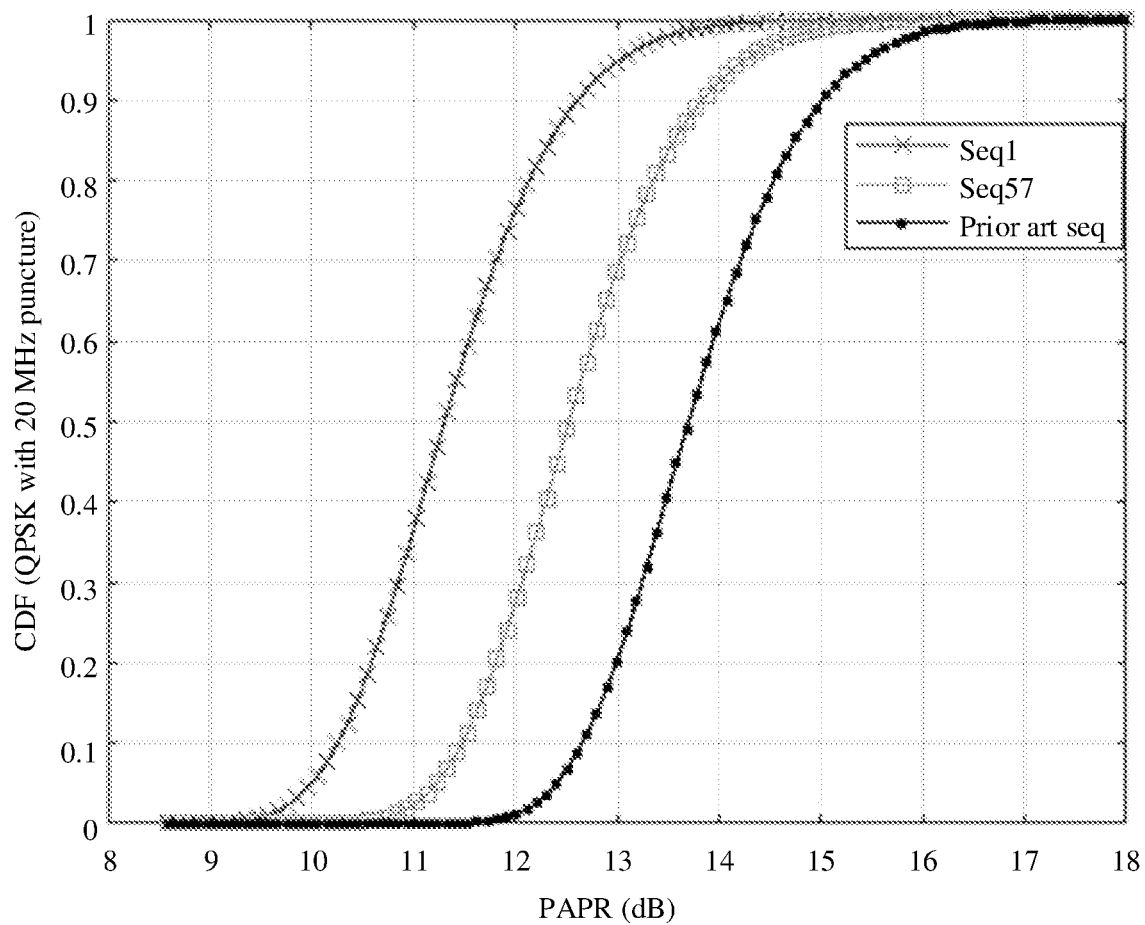
FIG. 9 is a schematic diagram of a simulation result of yet another PAPR according to an embodiment of this application.
Figure 10:
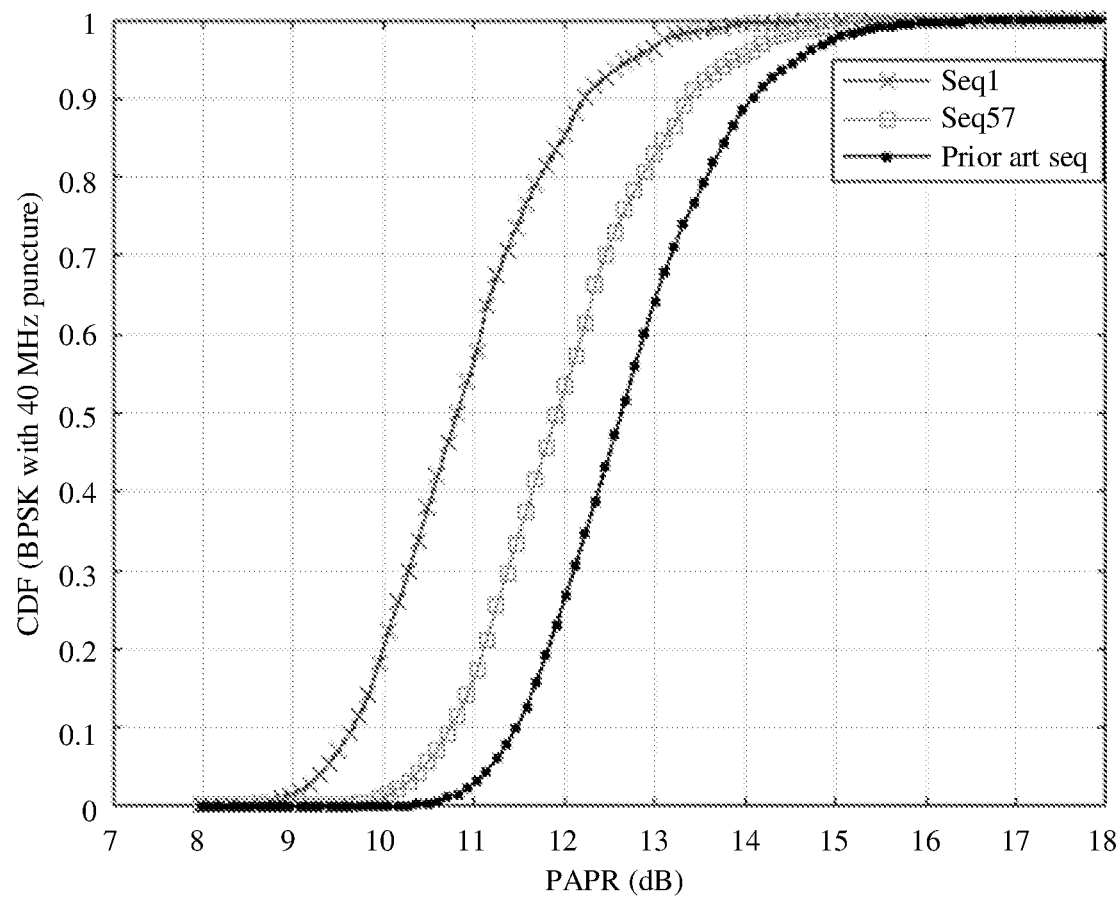
FIG. 10 is a schematic diagram of a simulation result of still yet another PAPR according to an embodiment of this application.
Figure 11:
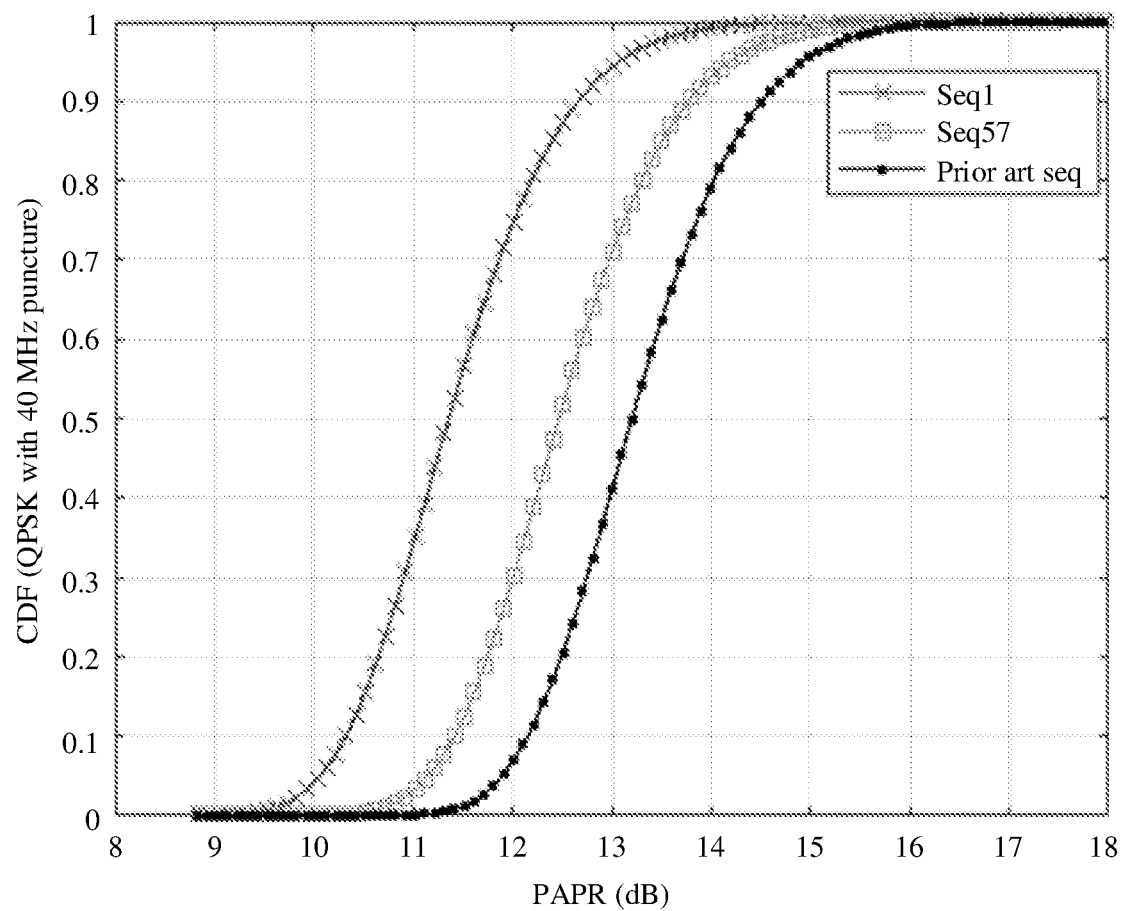
FIG. 11 is a schematic diagram of a simulation result of a further PAPR according to an embodiment of this application.

FIG. 6 shows a simulation result for a PPDU using the BPSK modulation scheme and of a non-punctured 320 MHz bandwidth. FIG. 7 shows a simulation result for a PPDU using the QPSK modulation scheme and of a non-punctured 320 MHz bandwidth. FIG. 8 shows a simulation result for a PPDU using the BPSK modulation scheme and of a 320 MHz bandwidth in a 20 MHz puncturing pattern. FIG. 9 shows a simulation result for a PPDU using the QPSK modulation scheme and of a 320 MHz bandwidth in a 20 MHz puncturing pattern. FIG. 10 shows a simulation result for a PPDU using the BPSK modulation scheme and of a 320 MHz bandwidth in a 40 MHz puncturing pattern. FIG. 11 shows a simulation result for a PPDU using the QPSK modulation scheme and of a 320 MHz bandwidth in a 40 MHz puncturing pattern.

For the rotation factor sequences whose sequence numbers are 1 and 57 and the rotation factor sequence in the related technology, it can be seen from FIG. 6 to FIG. 11 that the rotation factor sequence whose sequence number is 1 can most effectively reduce a PAPR of the PPDU of the 320 MHz bandwidth, and the rotation factor sequence whose sequence number is 57 can secondly effectively reduce a PAPR of the PPDU of the 320 MHz bandwidth. The rotation factor sequence provided in the related technology cannot effectively reduce a PAPR of the PPDU of the 320 MHz bandwidth.

Manner 2: Subcarriers that are in the 320 MHz bandwidth and that are used to carry the some fields or all fields of the PPDU are rotated based on rotation factors.

Optionally, in a scenario in which all the fields of the PPDU are duplicated and transmitted in the non-HT mode, subcarriers that carry all the fields of the PPDU are rotated based on rotation factors.

Optionally, in a scenario in which the some fields of the PPDU are duplicated and transmitted on a per-20 MHz sub-channel basis, subcarriers that carry the some fields of the PPDU are rotated based on rotation factors.

For example, for a correspondence between a subcarrier and a rotation factor, refer to Table 1. In Table 1, a first rotation factor in a rotation factor sequence corresponds to a subcarrier meeting k<−448. A second rotation factor corresponds to a subcarrier meeting 448≤k<−384. A third rotation factor corresponds to a subcarrier meeting −384≤k<−320. A fourth rotation factor corresponds to a subcarrier meeting −320≤k<−256. A fifth rotation factor corresponds to a subcarrier meeting −256≤k<−192. A sixth rotation factor corresponds to a subcarrier meeting −192≤k<−128. A seventh rotation factor corresponds to a subcarrier meeting −128≤k<−64. An eighth rotation factor corresponds to a subcarrier meeting −64≤k<0. A ninth rotation factor corresponds to a subcarrier meeting 0≤k<64. A tenth rotation factor corresponds to a subcarrier meeting 64≤k<128. An eleventh rotation factor corresponds to a subcarrier meeting 128≤k<192. A twelfth rotation factor corresponds to a subcarrier meeting 192≤k<256. A thirteenth rotation factor corresponds to a subcarrier meeting 256≤k<320. A fourteenth rotation factor corresponds to a subcarrier meeting 320≤k<384. A fifteenth rotation factor corresponds to a subcarrier meeting 384≤k<448. A sixteenth rotation factor corresponds to a subcarrier meeting k≥448. k is a number of a subcarrier.

It should be understood that the correspondence between the subcarrier and the rotation factor may be represented in a formula manner in addition to a table manner.

The following describes an example in which some rotation factor sequences in Table 1 are represented by using formulas. It should be understood that other rotation factor sequences in Table 1 may also be represented by referring to the following formula. The following formulas are merely examples, and variations of the following formulas also fall within the protection scope of embodiments of this application.

For example, for the rotation factor sequence whose sequence number is 1 in Table 1, the correspondence between the subcarrier and the rotation factor may be shown in Formula (1-1).

$$\gamma_{k,320\,MHz} = \begin{cases} 1, & k < -448 \\ 1, & -448 \leq k < -384 \\ 1, & -384 \leq k < -320 \\ 1, & -320 \leq k < -256 \\ 1, & -256 \leq k < -192 \\ -1, & -192 \leq k < -128 \\ 1, & -128 \leq k < -64 \\ 1, & -64 \leq k < 0 \\ -1, & 0 \leq k < 64 \\ -1, & 64 \leq k < 128 \\ -1, & 128 \leq k < 192 \\ 1, & 192 \leq k < 256 \\ 1, & 256 \leq k < 320 \\ -1, & 320 \leq k < 384 \\ 1, & 384 \leq k < 448 \\ -1, & k \geq 448 \end{cases} \quad (1\text{-}1)$$

Optionally, the foregoing Formula (1-1) may be transformed into Formula (1-2).

$$\gamma_{k,320\,MHz} = \begin{cases} 1, & k < -192 \\ -1, & -192 \leq k < -128 \\ 1, & -128 \leq k < 0 \\ -1, & 0 \leq k < 192 \\ 1, & 192 \leq k < 320 \\ -1, & 320 \leq k < 384 \\ 1, & 384 \leq k < 448 \\ -1, & k \geq 448 \end{cases} \quad (1\text{-}2)$$

$Y_{k,320\,MHz}$ represents a rotation factor corresponding to a subcarrier numbered k in the 320 MHz bandwidth.

For example, for the rotation factor sequence whose sequence number is 9 in Table 1, the correspondence between the subcarrier and the rotation factor may be shown in Formula (2-1).

$$\gamma_{k,320\,MHz} = \begin{cases} 1, & k < -448 \\ 1, & -448 \leq k < -384 \\ 1, & -384 \leq k < -320 \\ -1, & -320 \leq k < -256 \\ -1, & -256 \leq k < -192 \\ -1, & -192 \leq k < -128 \\ -1, & -128 \leq k < -64 \\ 1, & -64 \leq k < 0 \\ -1, & 0 \leq k < 64 \\ -1, & 64 \leq k < 128 \\ 1, & 128 \leq k < 192 \\ 1, & 192 \leq k < 256 \\ -1, & 256 \leq k < 320 \\ 1, & 320 \leq k < 384 \\ -1, & 384 \leq k < 448 \\ 1, & k \geq 448 \end{cases} \quad (2\text{-}1)$$

Optionally, the foregoing Formula (2-1) may be transformed into the following Formula (2-2).

$$\gamma_{k,320\,MHz} = \begin{cases} 1, & k < -320 \\ -1, & -320 \leq k < -64 \\ 1, & -64 \leq k < 0 \\ -1, & 0 \leq k < 128 \\ 1, & 128 \leq k < 256 \\ -1, & 256 \leq k < 320 \\ 1, & 320 \leq k < 384 \\ -1, & 384 \leq k < 448 \\ 1, & k \geq 448 \end{cases} \quad (2\text{-}2)$$

For example, for the rotation factor sequence whose sequence number is 17 in Table 1, the correspondence between the subcarrier and the rotation factor may be shown in Formula (3-1).

$$\gamma_{k,320\,MHz} = \begin{cases} 1, & k < -448 \\ 1, & -448 \leq k < -384 \\ 1, & -384 \leq k < -320 \\ 1, & -320 \leq k < -256 \\ -1, & -256 \leq k < -192 \\ -1, & -192 \leq k < -128 \\ -1, & -128 \leq k < -64 \\ -1, & -64 \leq k < 0 \\ 1, & 0 \leq k < 64 \\ -1, & 64 \leq k < 128 \\ 1, & 128 \leq k < 192 \\ -1, & 192 \leq k < 256 \\ -1, & 256 \leq k < 320 \\ 1, & 320 \leq k < 384 \\ 1, & 384 \leq k < 448 \\ -1, & k \geq 448 \end{cases} \quad (3\text{-}1)$$

Optionally, the foregoing Formula (3-1) may be transformed into the following Formula (3-2).

$$\gamma_{k,320\,MHz} = \begin{cases} 1, & k < -256 \\ -1, & -256 \leq k < 0 \\ 1, & 0 \leq k < 64 \\ -1, & 64 \leq k < 128 \\ 1, & 128 \leq k < 192 \\ -1, & 192 \leq k < 320 \\ 1, & 320 \leq k < 448 \\ -1, & k \geq 448 \end{cases} \quad (3\text{-}2)$$

For example, for the rotation factor sequence whose sequence number is 25 in Table 1, the correspondence between the subcarrier and the rotation factor may be shown in Formula (4-1).

$$\gamma_{k,320\,MHz} = \begin{cases} 1, & k < -448 \\ 1, & -448 \le k < -384 \\ 1, & -384 \le k < -320 \\ 1, & -320 \le k < -256 \\ 1, & -256 \le k < -192 \\ -1, & -192 \le k < -128 \\ 1, & -128 \le k < -64 \\ -1, & -64 \le k < 0 \\ 1, & 0 \le k < 64 \\ -1, & 64 \le k < 128 \\ -1, & 128 \le k < 192 \\ 1, & 192 \le k < 256 \\ 1, & 256 \le k < 320 \\ 1, & 320 \le k < 384 \\ -1, & 384 \le k < 448 \\ -1, & k \ge 448 \end{cases} \quad (4\text{-}1)$$

Optionally, the foregoing Formula (4-1) may be transformed into the following Formula (4-2).

$$\gamma_{k,320\,MHz} = \begin{cases} 1, & k < -192 \\ -1, & -192 \le k < -128 \\ 1, & -128 \le k < -64 \\ -1, & -64 \le k < 0 \\ 1, & 0 \le k < 64 \\ -1, & 64 \le k < 192 \\ 1, & 192 \le k < 384 \\ -1, & k \ge 384 \end{cases} \quad (4\text{-}2)$$

For example, for the rotation factor sequence whose sequence number is 33 in Table 1, the correspondence between the subcarrier and the rotation factor may be shown in Formula (5-1).

$$\gamma_{k,320\,MHz} = \begin{cases} 1, & k < -448 \\ 1, & -448 \le k < -384 \\ 1, & -384 \le k < -320 \\ 1, & -320 \le k < -256 \\ -1, & -256 \le k < -192 \\ 1, & -192 \le k < -128 \\ -1, & -128 \le k < -64 \\ 1, & -64 \le k < 0 \\ -1, & 0 \le k < 64 \\ 1, & 64 \le k < 128 \\ 1, & 128 \le k < 192 \\ -1, & 192 \le k < 256 \\ 1, & 256 \le k < 320 \\ 1, & 320 \le k < 384 \\ -1, & 384 \le k < 448 \\ -1, & k \ge 448 \end{cases} \quad (5\text{-}1)$$

Optionally, the foregoing Formula (5-1) may be transformed into the following Formula (5-1).

$$\gamma_{k,320\,MHz} = \begin{cases} 1, & k < -256 \\ -1, & -256 \le k < -192 \\ 1, & -192 \le k < -128 \\ -1, & -128 \le k < -64 \\ 1, & -64 \le k < 0 \\ -1, & 0 \le k < 64 \\ 1, & 64 \le k < 192 \\ -1, & 192 \le k < 256 \\ 1, & 256 \le k < 384 \\ -1, & k \ge 384 \end{cases} \quad (5\text{-}2)$$

For example, for the rotation factor sequence whose sequence number is 41 in Table 1, the correspondence between the subcarrier and the rotation factor may be shown in Formula (6-1).

$$\gamma_{k,320\,MHz} = \begin{cases} 1, & k < -448 \\ 1, & -448 \le k < -384 \\ 1, & -384 \le k < -320 \\ 1, & -320 \le k < -256 \\ 1, & -256 \le k < -192 \\ -1, & -192 \le k < -128 \\ -1, & -128 \le k < -64 \\ -1, & -64 \le k < 0 \\ 1, & 0 \le k < 64 \\ -1, & 64 \le k < 128 \\ 1, & 128 \le k < 192 \\ -1, & 192 \le k < 256 \\ -1, & 256 \le k < 320 \\ 1, & 320 \le k < 384 \\ -1, & 384 \le k < 448 \\ -1, & k \ge 448 \end{cases} \quad (6\text{-}1)$$

Optionally, the foregoing Formula (6-1) may be transformed into the following Formula (6-2).

$$\gamma_{k,320\,MHz} = \begin{cases} 1, & k < -192 \\ -1, & -192 \le k < 0 \\ 1, & 0 \le k < 64 \\ -1, & 64 \le k < 128 \\ 1, & 128 \le k < 192 \\ -1, & 192 \le k < 320 \\ 1, & 320 \le k < 384 \\ -1, & k \ge 384 \end{cases} \quad (6\text{-}2)$$

For example, for the rotation factor sequence whose sequence number is 49 in Table 1, the correspondence between the subcarrier and the rotation factor may be shown in Formula (7-1).

$$\gamma_{k,320\,MHz} = \begin{cases} 1, & k < -448 \\ 1, & -448 \le k < -384 \\ 1, & -384 \le k < -320 \\ -1, & -320 \le k < -256 \\ -1, & -256 \le k < -192 \\ -1, & -192 \le k < -128 \\ 1, & -128 \le k < -64 \\ -1, & -64 \le k < 0 \\ -1, & 0 \le k < 64 \\ -1, & 64 \le k < 128 \\ 1, & 128 \le k < 192 \\ -1, & 192 \le k < 256 \\ 1, & 256 \le k < 320 \\ 1, & 320 \le k < 384 \\ -1, & 384 \le k < 448 \\ 1, & k \ge 448 \end{cases} \quad (7\text{-}1)$$

Optionally, the foregoing Formula (7-1) may be transformed into the following Formula (7-2).

$$\gamma_{k,320MHz} = \begin{cases} 1, & k < -320 \\ -1, & -320 \le k < -128 \\ 1, & -128 \le k < -64 \\ -1, & -64 \le k < 0 \\ 1, & 128 \le k < 192 \\ -1, & 192 \le k < 256 \\ 1, & 256 \le k < 384 \\ -1, & 384 \le k < 448 \\ 1, & k \ge 448 \end{cases} \quad (7\text{-}2)$$

For example, for the rotation factor sequence whose sequence number is 57 in Table 1, the correspondence between the subcarrier and the rotation factor may be shown in Formula (8-1).

$$\gamma_{k,320MHz} = \begin{cases} 1, & k < -448 \\ -1, & -448 \le k < -384 \\ -1, & -384 \le k < -320 \\ -1, & -320 \le k < -256 \\ 1, & -256 \le k < -192 \\ -1, & -192 \le k < -128 \\ -1, & -128 \le k < -64 \\ -1, & -64 \le k < 0 \\ 1, & 0 \le k < 64 \\ -1, & 64 \le k < 128 \\ -1, & 128 \le k < 192 \\ -1, & 192 \le k < 256 \\ -1, & 256 \le k < 320 \\ 1, & 320 \le k < 384 \\ 1, & 384 \le k < 448 \\ 1, & k \ge 448 \end{cases} \quad (8\text{-}1)$$

Optionally, the foregoing Formula (8-1) may be transformed into the following Formula (8-2).

$$\gamma_{k,320MHz} = \begin{cases} 1, & k < -448 \\ -1, & -448 \le k < -256 \\ 1, & -256 \le k < -192 \\ -1, & -192 \le k < 0 \\ 1, & 0 \le k < 64 \\ -1, & 64 \le k < 320 \\ 1, & k \ge 320 \end{cases} \quad (8\text{-}2)$$

For example, for the rotation factor sequence whose sequence number is 59 in Table 1, the correspondence between the subcarrier and the rotation factor may be shown in Formula (9-1).

$$\gamma_{k,320MHz} = \begin{cases} 1, & k < -448 \\ -1, & -448 \le k < -384 \\ -1, & -384 \le k < -320 \\ -1, & -320 \le k < -256 \\ -1, & -256 \le k < -192 \\ 1, & -192 \le k < -128 \\ 1, & -128 \le k < -64 \\ 1, & -64 \le k < 0 \\ -1, & 0 \le k < 64 \\ 1, & 64 \le k < 128 \\ 1, & 128 \le k < 192 \\ 1, & 192 \le k < 256 \\ -1, & 256 \le k < 320 \\ 1, & 320 \le k < 384 \\ 1, & 384 \le k < 448 \\ 1, & k \ge 448 \end{cases} \quad (9\text{-}1)$$

Optionally, the foregoing Formula (9-1) may be transformed into the following Formula (9-2).

$$\gamma_{k,320MHz} = \begin{cases} 1, & k < -448 \\ -1, & -448 \le k < -192 \\ 1, & -192 \le k < 0 \\ -1, & 0 \le k < 64 \\ 1, & 64 \le k < 256 \\ -1, & 256 \le k < 320 \\ 1, & k \ge 320 \end{cases} \quad (9\text{-}2)$$

S102: The transmit device sends the PPDU to the receive device. Correspondingly, the receive device receives the PPDU sent by the transmit device.

Optionally, when all the fields of the PPDU are transmitted in a non-HT duplicate mode, the receive end receives all the fields of the PPDU in the non-HT duplicate mode.

Optionally, when the some fields of the PPDU are duplicated and transmitted on a per-20 MHz sub-channel basis, the receive end receives the some fields of the PPDU on a per-20 MHz sub-channel basis. It should be understood that, for a field that is in the PPDU and that is not duplicated and transmitted on a per-20 MHz sub-channel basis, the receive end receives the field through the 320 MHz bandwidth.

S103: The receive device parses the PPDU.

In a possible implementation, the receive device may perform rotation recovery on the some or all fields of the received PPDU in the 320 MHz bandwidth and based on a rotation recovery factor sequence corresponding to the rotation factor sequence, to obtain a PPDU before rotation.

The rotation factors in the rotation factor sequence are in a one-to-one correspondence with rotation recovery factors in the rotation recovery factor sequence. In addition, a product of a rotation factor and a corresponding rotation recovery factor is 1.

For example, when a rotation factor corresponding to a 20 MHz sub-channel used by the transmit device is 1, a rotation recovery factor corresponding to the receive device during rotation recovery may be 1. When a rotation factor corresponding to a 20 MHz sub-channel used by the transmit device is −1, a rotation recovery factor corresponding to the receive device during rotation recovery may be −1. When a rotation factor corresponding to a 20 MHz sub-channel used by the transmit device is −j, a rotation recovery factor corresponding to the receive device during rotation recovery may be j. When a rotation factor corresponding to a 20 MHz sub-channel used by the transmit device is j, a rotation recovery factor corresponding to the receive device during rotation recovery may be −j.

In another possible implementation, the receive device may perform, based on a rotation recovery factor, rotation recovery on the subcarriers that carry the some or all fields of the PPDU, to obtain a PPDU before rotation. A product of the rotation factor of the subcarriers and the rotation recovery factor of the subcarriers is 1.

For example, for each subcarrier in the 320 MHz bandwidth, the receive device may also perform rotation recovery on the subcarrier by multiplying the subcarrier by the rotation recovery factor. When a rotation factor corresponding to the subcarrier used by the transmit device is 1, a rotation recovery factor corresponding to the receive device during rotation recovery may be 1. When a rotation factor corresponding to the subcarrier used by the transmit device is −1, a rotation recovery factor corresponding to the receive device during rotation recovery may be −1. When a rotation factor corresponding to the subcarrier used by the transmit device is −j, a rotation recovery factor corresponding to the receive device during rotation recovery may be j. When a rotation factor corresponding to the subcarrier used by the transmit device is j, a rotation recovery factor corresponding to the receive device during rotation recovery may be −j.

In another possible implementation, the receive device directly uses a rotation factor as a part of a channel, and removes the rotation factor through channel estimation and channel equalization to obtain the PPDU before rotation.

Based on the rotation factor sequence provided in this embodiment of this application, the PAPR of the PPDU of the 320 MHz bandwidth can be effectively reduced.

The foregoing mainly describes the solutions provided in embodiments of this application from the perspective of the methods. It may be understood that, to implement the foregoing functions, the communication apparatus includes a corresponding hardware structure and/or software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of technical solutions. A person skilled in the art may use different methods to implement the described functions for each particular application, but it should not be considered that the implementation goes beyond the scope of this application.

In embodiments of this application, the apparatus may be divided into functional modules based on the foregoing method examples. For example, each functional module may be obtained through division based on each corresponding function, or two or more functions may be integrated into one functional module. The integrated module may be implemented in a form of hardware, or may be implemented in a form of a software functional module. In embodiments of this application, module division is an example, and is merely a logical function division. In actual implementation, another division manner may be used. An example in which each functional module is obtained through division based on each corresponding function is used below for description.

Figure 12:
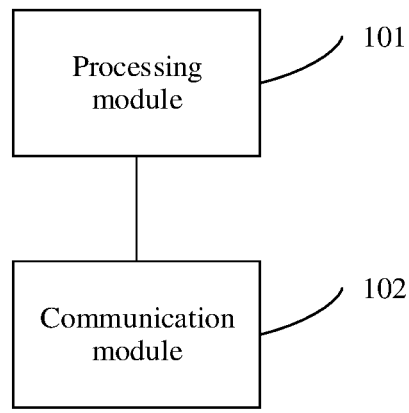
FIG. 12 is a schematic diagram of a structure of a communication apparatus according to an embodiment of this application.

FIG. 12 shows a communication apparatus according to an embodiment of this application. The communication apparatus includes a processing module 101 and a communication module 102. It should be understood that when the communication apparatus is a transmit device, or the communication apparatus is applied to a transmit device, the communication apparatus has any function of the transmit device in the foregoing method. When the communication apparatus is a receive device, or the communication apparatus is applied to a receive device, the communication apparatus has any function of the receive device in the foregoing method.

For example, the communication apparatus is a transmit device, or the communication apparatus is applied to a transmit device. The processing module 101 is configured to perform the step S101 in FIG. 5, and the communication module 102 is configured to perform the step S102 in FIG. 5.

For example, the communication apparatus is a receive device, or the communication apparatus is applied to a receive device. The communication module 102 is configured to perform the step S102 in FIG. 5, and the processing module 101 is configured to perform the step S103 in FIG. 5.

The following describes a possible product form of the communication apparatus. It should be understood that all forms of products having features of the communication apparatus fall within the protection scope of this application. It should be further understood that the following description is merely an example, and does not limit a product form of the communication apparatus in embodiments of this application.

Figure 13:
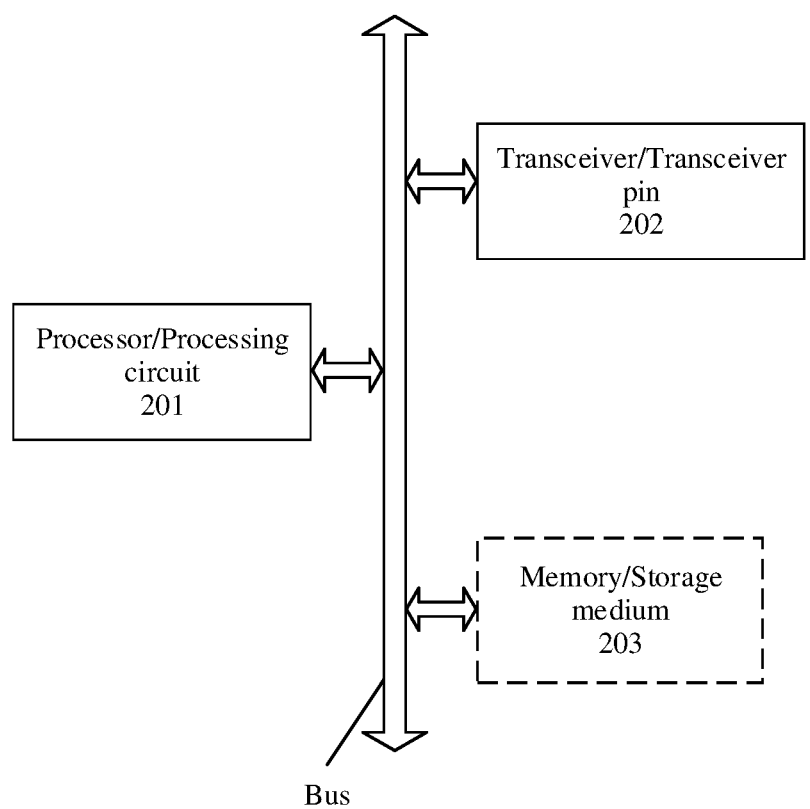
FIG. 13 is a schematic diagram of a structure of another communication apparatus according to an embodiment of this application.

FIG. 13 is a diagram of a structure of a possible product form of a communication apparatus according to an embodiment of this application.

In a possible product form, the communication apparatus in this embodiment of this application may be a communication device, and the communication device includes a processor 201 and a transceiver 202. Optionally, the communication device further includes a memory 203.

When the communication apparatus is a transmit device, the processor 201 is configured to perform the step S101 in FIG. 5, and the transceiver 202 is configured to perform the step S102 in FIG. 5.

When the communication apparatus is a receive device, the transceiver 202 is configured to perform the step S102 in FIG. 5, and the processor 201 is configured to perform the step S103 in FIG. 5.

As a possible product form, the communication apparatus described in embodiments of this application may be implemented by using a chip. The chip includes a processing circuit 201 and a transceiver pin 202. Optionally, the chip may further include a storage medium 203.

In another possible product form, the communication apparatus described in this embodiment of this application may alternatively be implemented by using the following circuit or component: one or more field programmable gate arrays (FPGA), a programmable logic device (PLD), a controller, a state machine, gate logic, a discrete hardware component, any other suitable circuits, or any combination of circuits that can perform various functions described in this application.

Optionally, an embodiment of this application further provides a computer-readable storage medium. The computer-readable storage medium stores computer instructions. When the computer instructions are run on a computer, the computer is enabled to perform the communication method in the foregoing method embodiments.

Optionally, an embodiment of this application further provides a computer program product including computer instructions. When the computer instructions are run on a computer, the computer is enabled to perform the communication method in the foregoing method embodiments.

It should be understood that the computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

It should be understood that the apparatus and method disclosed in the several embodiments provided in this application may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
generating a physical layer protocol data unit (PPDU) of a 320 MHz bandwidth, wherein some or all fields of the PPDU are rotated in the 320 MHz bandwidth based on a rotation factor sequence, the 320 MHz bandwidth comprises sixteen 20 MHz sub-channels, the rotation factor sequence comprises 16 rotation factors, and each 20 MHz sub-channel corresponds to one rotation factor; and
sending the PPDU; and
wherein the rotation factor sequence is [1, −1, −1, −1, 1, −1, −1, −1, 1, −1, −1, −1, −1, 1, 1, 1]; and
wherein for the rotation factor sequence, a correspondence between a subcarrier and the corresponding rotation factor is shown as the following:

$$\gamma_{k,320MHz} = \begin{cases} 1, & k < -448 \\ -1, & -448 \leq k < -256 \\ 1, & -256 \leq k < -192 \\ -1, & -192 \leq k < 0 \\ 1, & 0 \leq k < 64 \\ -1, & 64 \leq k < 320 \\ 1, & k \geq 320 \end{cases} ;$$

and
wherein k is a subcarrier index.

2. The method according to claim 1, wherein all the fields of the PPDU are transmitted in a non-high throughput (non-HT) duplicate mode.

3. The method according to claim 2, wherein all the fields of the PPDU are rotated based on the rotation factor sequence.

4. The method according to claim 2, wherein all the fields of the PPDU comprise a legacy short training field (L-STF), a legacy long training field (L-LTF), a legacy signal field (L-SIG field), and a data field.

5. The method according to claim 1, wherein the some fields of the PPDU are duplicated and transmitted on a per-20 MHz sub-channel basis.

6. The method according to claim 5, wherein the some fields of the PPDU are rotated based on the rotation factor sequence.

7. The method according to claim 5, wherein the some fields of the PPDU comprise one or more of the following fields: a legacy short training field (L-STF), a legacy long training field (L-LTF), a legacy signal field (L-SIG field), a repeated legacy signal field (RL-SIG field), or a universal signal field (U-SIG field).

8. The method according to claim 7, wherein a rate of the L-SIG field is a fixed value, and a value of a length indicated by the L-SIG field is set in a preset manner to distinguish between protocol versions.

9. The method according to claim 7, wherein the L-SIG field carries fixed values [−1, −1, −1, 1] on four subcarriers −28, −27, 27, and 28 of each 20 MHz sub-channel, and the RL-SIG field carries fixed values [−1, −1, −1, 1] on four subcarriers −28, −27, 27, and 28 of each 20 MHz sub-channel.

10. The method according to claim 7, wherein the U-SIG field transmits additional information on four subcarriers −28, −27, 27, and 28 of each 20 MHz sub-channel, and an extremely high throughput signal field (EHT-SIG field) of the PPDU transmits additional information on four subcarriers −28, −27, 27, and 28 of each 20 MHz sub-channel.

11. An apparatus, comprising a processor and a transceiver, wherein:
the processor is configured to generate a physical layer protocol data unit (PPDU) of a 320 MHz bandwidth, wherein some or all fields of the PPDU are rotated in the 320 MHz bandwidth based on a rotation factor sequence, the 320 MHz bandwidth comprises sixteen 20 MHz sub-channels, the rotation factor sequence comprises 16 rotation factors, and each 20 MHz sub-channel corresponds to one rotation factor; and the transceiver is configured to send the PPDU; and wherein the rotation factor sequence is [1, −1, −1, −1, 1, −1, −1, −1, 1, −1, −1, −1, −1, 1, 1, 1]; and wherein for the rotation factor sequence, a correspondence between a subcarrier and the corresponding rotation factor is shown as the following:

$$\gamma_{k,320MHz} = \begin{cases} 1, & k < -448 \\ -1, & -448 \leq k < -256 \\ 1, & -256 \leq k < -192 \\ -1, & -192 \leq k < 0 \\ 1, & 0 \leq k < 64 \\ -1, & 64 \leq k < 320 \\ 1, & k \geq 320 \end{cases} ;$$

and wherein k is a subcarrier index.

12. The apparatus according to claim 11, wherein the some fields of the PPDU are duplicated and transmitted on a per-20 MHz sub-channel basis.

13. The apparatus according to claim 12, wherein the some fields of the PPDU are rotated based on the rotation factor sequence.

14. The apparatus according to claim 12, wherein the some fields of the PPDU comprise one or more of the following fields: a legacy short training field (L-STF), a legacy long training field (L-LTF), a legacy signal field (L-SIG field), a repeated legacy signal field (RL-SIG field), or a universal signal field (U-SIG field).

15. The apparatus according to claim 14, wherein the L-SIG field carries fixed values [−1, −1, −1, 1] on four subcarriers −28, −27, 27, and 28 of each 20 MHz sub-channel, and the RL-SIG field carries fixed values [−1, −1, −1, 1] on four subcarriers −28, −27, 27, and 28 of each 20 MHz sub-channel.

16. The apparatus according to claim 14, wherein the U-SIG field transmits additional information on four subcarriers −28, −27, 27, and 28 of each 20 MHz sub-channel, and an extremely high throughput signal field (EHT-SIG field) of the PPDU transmits additional information on four subcarriers −28, −27, 27, and 28 of each 20 MHz sub-channel.

\* \* \* \* \*